US012448149B2

(12) United States Patent
Lei et al.

(10) Patent No.: US 12,448,149 B2
(45) Date of Patent: Oct. 21, 2025

(54) METHOD FOR DOCKING BOARDING BRIDGE WITH AIRCRAFT, ELECTRONIC EQUIPMENT AND STORAGE MEDIUM

(71) Applicant: SHENZHEN CIMC-TIANDA AIRPORT SUPPORT LTD., Guangdong (CN)

(72) Inventors: Anliang Lei, Guangdong (CN); Lan Deng, Guangdong (CN); Wei Xiang, Guangdong (CN); Lexian Liang, Guangdong (CN); Wei Luo, Guangdong (CN); Xiuqiang Yu, Guangdong (CN)

(73) Assignee: SHENZHEN CIMC-TIANDA AIRPORT SUPPORT LTD., Guangdong (CN)

( * ) Notice: Subject to any disclaimer, the term of this patent is extended or adjusted under 35 U.S.C. 154(b) by 992 days.

(21) Appl. No.: 17/616,358

(22) PCT Filed: Jun. 4, 2020

(86) PCT No.: PCT/CN2020/094432
§ 371 (c)(1),
(2) Date: Dec. 3, 2021

(87) PCT Pub. No.: WO2020/244591
PCT Pub. Date: Dec. 10, 2020

(65) Prior Publication Data
US 2022/0324588 A1   Oct. 13, 2022

(30) Foreign Application Priority Data
Jun. 4, 2019   (CN) .......................... 201910482725.1

(51) Int. Cl.
*B64F 1/30* (2006.01)
*B64F 1/00* (2024.01)
(Continued)

(52) U.S. Cl.
CPC ............ *B64F 1/3055* (2013.01); *B64F 1/002* (2013.01); *G05D 1/0225* (2013.01)

(58) Field of Classification Search
CPC .............................. B64F 1/3055; B64F 1/002
See application file for complete search history.

(56) References Cited

U.S. PATENT DOCUMENTS

| 5,226,204 A | 7/1993 | Schoenberger et al. |
| 6,078,849 A * | 6/2000 | Brady .................. G05D 1/0234 |
| | | 701/1 |

(Continued)

FOREIGN PATENT DOCUMENTS

| CN | 1639003 A | 7/2005 |
| CN | 101287649 A | 10/2008 |

(Continued)

OTHER PUBLICATIONS

Extended Supplementary European Search Report dated May 12, 2023 received in European Application No. 20 81 7892.1.

(Continued)

*Primary Examiner* — Abigail A Risic
(74) *Attorney, Agent, or Firm* — Scully, Scott, Murphy & Presser, P.C.

(57) ABSTRACT

A method for docking a boarding bridge with an aircraft, an electronic equipment and a storage medium are provided. The method includes: planning a path from a position at which a bridgehead is located when the boarding bridge is at a parking position to a pre-docking position which is 1 to 2 meters away from a cabin door of the aircraft, driving the boarding bridge to move the bridgehead towards the pre-docking position along the path until the bridgehead moves to a position within 2 meters away from the pre-docking position; acquiring an aircraft image of the aircraft, obtaining a spatial position of the cabin door according to the aircraft image, and moving the boarding bridge according to (Continued)

the spatial position to enable the bridgehead to dock with the cabin door.

17 Claims, 11 Drawing Sheets

(51) Int. Cl.
*B64F 1/305* (2006.01)
*G05D 1/00* (2006.01)
*G05D 1/02* (2020.01)

(56) References Cited

U.S. PATENT DOCUMENTS

| | | | |
|---|---|---|---|
| 10,392,130 B2* | 8/2019 | Tan | G01S 17/89 |
| 10,908,580 B2 | 2/2021 | Truscott | |
| 2003/0145405 A1 | 8/2003 | Hutton | |
| 2004/0187234 A1* | 9/2004 | Hutton | B64F 1/3055 14/71.5 |
| 2005/0198750 A1* | 9/2005 | Spencer | B64F 1/3055 14/71.5 |
| 2006/0070193 A1 | 4/2006 | Hutton et al. | |
| 2006/0288502 A1 | 12/2006 | Hutton | |
| 2006/0288503 A1 | 12/2006 | Hutton | |
| 2007/0214584 A1 | 9/2007 | Hutton | |
| 2008/0098538 A1 | 5/2008 | Hutton | |
| 2008/0109970 A1* | 5/2008 | Hutton | G01S 13/758 14/71.5 |
| 2008/0229525 A1* | 9/2008 | Hutton | B64F 1/002 14/71.5 |
| 2008/0231472 A1* | 9/2008 | Hutton | B64F 1/3055 340/958 |
| 2015/0142218 A1* | 5/2015 | Lin | G08G 5/51 701/3 |
| 2017/0262732 A1* | 9/2017 | Deng | B64F 1/002 |
| 2017/0263139 A1* | 9/2017 | Deng | G06T 7/90 |
| 2018/0354650 A1* | 12/2018 | Tan | G01S 17/933 |

FOREIGN PATENT DOCUMENTS

| | | |
|---|---|---|
| CN | 101840205 A | 9/2010 |
| CN | 103419944 A | 12/2013 |
| CN | 205801544 U | 12/2016 |
| CN | 106295192 A | 1/2017 |
| CN | 106628232 A | 5/2017 |
| CN | 106697322 A | 5/2017 |
| CN | 206664955 U | 11/2017 |
| CN | 107985625 A | 5/2018 |
| CN | 108454875 A | 8/2018 |
| CN | 109592063 A | 4/2019 |
| EP | 1897805 A1 | 3/2008 |
| ES | 2 385 883 A1 | 8/2012 |
| JP | H01168599 A | 7/1989 |
| JP | H102182598 A | 7/1990 |
| JP | 6502570 B1 | 4/2019 |
| KR | 20130123997 A | 11/2013 |
| WO | 2017137241 A1 | 8/2017 |
| WO | 2017198605 A1 | 11/2017 |
| WO | 2018034615 A8 | 2/2018 |
| WO | WO-2019012648 A1 * | 1/2019 ............ B64F 1/305 |

OTHER PUBLICATIONS

International Search Report dated Sep. 14, 2020 issued in PCT/CN2020/094224.
International Search Report dated Sep. 10, 2020 issued in PCT/CN2020/094432.
International Search Report dated Sep. 9, 2020 issued in PCT/CN2020/094446.
International Search Report dated Nov. 10, 2020 issued in PCT/CN2020/108962.

* cited by examiner

METHOD FOR DOCKING BOARDING BRIDGE WITH AIRCRAFT, ELECTRONIC EQUIPMENT AND STORAGE MEDIUM

CROSS-REFERENCE TO RELATED APPLICATIONS

The present disclosure is based on the International Application No. PCT/CN2020/094432, filed on Jun. 4, 2020, which is based upon and claims priority to Chinese patent application No. 201910482725.1, filed on Jun. 4, 2019, which is incorporated herein by reference in its entirety.

TECHNICAL FIELD

The present disclosure relates to boarding bridge technologies, and more particularly, to a method for docking a boarding bridge with an aircraft, an electronic equipment and a storage medium.

BACKGROUND

The boarding bridge used as an important ground equipment for docking with an aircraft is currently manually docked and withdrawn. However, the operator of the boarding bridge has been defined as an operator for a special work category, i.e., a new operator needs to experience a systematic training for about 3 months and then would be approved for operation through a trial examination for more than half a year, and accumulated experiences shall be gained through a continuous learning process with a skilled operator so that a higher technical level can be achieved, in such case, the shortage of boarding bridge operators become a more prominent problem; meanwhile, due to the influence of factors such as leaving and transferring of operators, the running of the aircraft boarding bridge equipment for the airport becomes even more difficult.

In addition, the of operation of the boarding bridge professionally difficult. Each time when docking with the aircrafts, the operator has to pay carefully and cautiously attention to the operation even though the operator has been strictly trained and fully practiced, which may cause self-evident working pressure. Often, in actual work. In the real working situation, operators can be frequently influenced by environment or emergencies, and missing or wrongly performing the relevant operation steps may occur, resulting in accidents like the collision between the boarding bridge and the aircraft or even damage of the aircraft. In addition, erroneous or improper operation may put other personnel and equipment on the airport apron in jeopardize.

With the development and progress of technology, the intelligent level of docking the boarding bridge with the aircraft needs to be improved, the influence of human factors needs to be reduced, and the docking efficiency needs to be improved.

SUMMARY

A series of concepts in a simplified form are introduced in the present disclosure, which would be further described in detail in the embodiment. The content of the summary does not attempt to limit the key features and necessary technical features of the claimed technical solution, let alone determine the protection scope of the claimed technical solution.

According to one aspect of the present disclosure, a method for docking a boarding bridge with an aircraft is provided, which including:

planning a path from a position at which a bridgehead is located when the boarding bridge is at a parking position to a pre-docking position which is 1 to 2 meters away from a cabin door of the aircraft, driving the boarding bridge to move the bridgehead towards the pre-docking position along the path until the bridgehead moves to a position within 2 meters away from the pre-docking position, acquiring an aircraft image of the aircraft, obtaining a spatial position of the cabin door according to the aircraft image, moving the boarding bridge according to the spatial position to enable the bridgehead to dock with the cabin door.

According to one exemplary embodiment of the present disclosure, the acquiring an aircraft image of the aircraft, obtaining a spatial position of the cabin door according to the acquired aircraft image, moving the boarding bridge according to the spatial position to enable the bridgehead to dock with the cabin door includes:

acquiring the aircraft image in real time when the bridgehead moving from a position within 2 meters away from the pre-docking position to a position where the bridgehead is docked with the cabin door, and updating a spatial position of the cabin door in real time according to the aircraft image; and moving the boarding bridge according to a newly acquired spatial position of the cabin door as a docking destination of the bridgehead until the bridgehead is docked with the cabin door.

According to one exemplary embodiment of the present disclosure, the acquiring the aircraft image in real time when the bridgehead is moving from a position within 2 meters away from the pre-docking position to a position where the bridgehead is docked with the cabin door, and updating a spatial position of the cabin door in real time according to the aircraft image includes:

acquiring the aircraft image;

identifying a region of interest of the cabin door in the aircraft image according to features of the cabin door; and obtaining a spatial position of a cabin door sill according features of a bottom of the cabin door and the region of interest of the cabin door.

According to one exemplary embodiment of the present disclosure, the obtaining a spatial position of a cabin door sill according to features of a bottom of the cabin door and the region of interest of the cabin door includes:

identifying a frame of the cabin door in the region of interest of the cabin door according to the features of the bottom of the cabin door; and acquiring a spatial position of the frame of the cabin door according to a position of the frame of the cabin door in the aircraft image.

According to one exemplary embodiment of the present disclosure, the identifying a frame of the cabin door in the region of interest of the cabin door according to the features of the bottom of the cabin door includes:

identifying the cabin door sill in the region of interest of the cabin door, and marking a top center point of the cabin door sill as an identification point;

searching door seam lines in images at two sides of the identification point; and acquiring an intersection of a horizontal line and a vertical line of the door seam lines as an endpoint of the cabin door sill.

According to one exemplary embodiment of the present disclosure, the method further includes:
acquiring a bottom region of the cabin door containing the cabin door sill according to the position of the cabin door sill in the aircraft image, and establishing a bottom model of the cabin door according to the bottom region of the cabin door;
re-acquiring the aircraft image;
searching a bottom region of interest in a newly acquired aircraft image by matching the bottom model of the cabin door; and
updating a spatial position of the cabin door sill of the aircraft according to the bottom region of interest in the newly acquired aircraft image.

According to one exemplary embodiment of the present disclosure, the method further includes, after matching the bottom model of the cabin door, a step of:
calculating a matching degree between the bottom model of the cabin door and the newly acquired bottom region of interest, and in case that the matching degree is smaller than a preset threshold value, reestablishing the bottom model of the cabin door according to the newly acquired bottom region of interest.

According to one exemplary embodiment of the present disclosure, the step of identifying a region of interest of the cabin door in the aircraft image according to the features of the cabin door includes:
performing edge detection on the aircraft image to obtain a plurality of edge lines;
extracting vertical lines extending in a vertical direction from the plurality of edge lines, and calculating spatial positions of two endpoints of each of the vertical lines;
calculating a length of each of the vertical lines and a spacing between every two vertical lines according to the spatial positions of the two endpoints of each of the vertical lines;
delimiting a region between two vertical lines in the aircraft image as a region of interest of the cabin door when lengths of the two vertical lines of the plurality of vertical lines are matched with a length of the cabin door, a spacing between the two vertical lines is matched with a width of the cabin door, and a ratio of the lengths of the two vertical lines to the spacing between the two vertical lines is matched with a ratio of the length to the width of the cabin door.

According to one exemplary embodiment of the present disclosure, the planning a path from a position at which a bridgehead is located when the boarding bridge is at a parking position to a pre-docking position which is 1 to 2 meters away from a cabin door, and driving the boarding bridge to move the bridgehead towards the pre-docking position along the path until the bridgehead moves to a position within 2 meters away from the pre-docking position includes:
acquiring a preset anti-collision line of a wing;
acquiring a pre-docking position and a position at which the bridgehead is located when the boarding bridge is at the parking position, and generating a path for connecting the two positions;
simulating the process of the boarding bridge moving to the pre-docking position along the path, and adjusting at least a part of the path in front of an engine in a direction radially away from the engine in case that an interference is formed between the anti-collision line of the wing and an outer contour of the boarding bridge during the simulating, and then simulating again unless no more interference between the anti-collision line of the wing and the outer contour of the boarding bridge be formed; and
driving the boarding bridge to move the bridgehead towards the pre-docking position along the path until the bridgehead moves to a position within 2 meters from the pre-docking position.

According to one exemplary embodiment of the present disclosure, a first inflection point is added to the path when the path is adjusted, and
the first inflection point is located in front of the engine closest to the cabin door and at least 1.5 meters away from the closest engine and the wing on which the closest engine is installed.

According to one exemplary embodiment of the present disclosure, a second inflection point is added to the path when the path is adjusted, and
the second inflection point is located in front of the engine which is on the same side of the cabin door but furthest from the cabin door, and the second inflection point is at least 1.5 meters away from the engine.

According to one exemplary embodiment of the present disclosure, a third inflection point is added to the path when the path is adjusted, and
the third inflection point is located in front of a tail end of the wing and at least 1.5 meters away from the wing.

According to one exemplary embodiment of the present disclosure, the anti-collision line of the wing comprises a first line segment extending from the front of the tail end of the wing to the front of the engine closest to the cabin door, and a second line segment extending from an end of the first line segment adjacent to the cabin door to a side of the cabin door facing away from an aircraft nose.

According to one exemplary embodiment of the present disclosure, the method further includes: establishing a first coordinate system fixed relative to the ground and a second coordinate system fixed relative to the aircraft;
where, coordinates of positions of a ground identification and the bridgehead in the first coordinate system are known, and coordinates of the ground identification, the cabin door and anti-collision feature points in the second coordinate system are known;
the process of acquiring the pre-docking position comprises: calculating the coordinate of the cabin door in the first coordinate system according to coordinates of the ground identification in the first coordinate system and the second coordinate system and the coordinate of the cabin door in the second coordinate system, and calculating a coordinate of a pre-docking point according to the coordinate of the cabin door in the first coordinate system;
the process of acquiring the anti-collision line of the wing comprises: calculating coordinates of the anti-collision feature points in the first coordinate system according to the coordinates of the ground identification in the first coordinate system and the second coordinate system and coordinates of the anti-collision feature points in the second coordinate system, and connecting the anti-collision feature points so that the anti-collision line of the wing is acquired;
generating the path in the first coordinate system;
where, the ground identification is characterized by a plurality of identification feature points, the bridgehead is characterized by bridgehead feature points, the cabin door is characterized by a cabin door feature point, and the pre-docking position is characterized by the pre-docking point.

According to one exemplary embodiment of the present disclosure, the identification feature points of the ground identification are intersection points where centerlines of two parking lines respectively intersect with a centerline of a guide line.

According to one exemplary embodiment of the present disclosure, the first coordinate system and the second coordinate system are both rectangular coordinate systems;

where the Z-axis of the first coordinate system is vertical to the ground, and an origin of the first coordinate system is on the ground; an origin of the second coordinate system is at one of the identification feature points, the x-axis of the second coordinate system is vertical to the guide line, the y-axis is parallel to the guide line, and the z-axis is vertical to the ground.

According to another aspect of the present disclosure, a computer-readable storage medium is provided, on which computer programs are stored, wherein the computer programs, when executed by a processor, implement the method as described above.

According to another aspect of the present disclosure, an electronic device is provided, which includes:
a processor; and
a memory for storing executable instructions of the processor;
the processor is configured to perform the method as described above by executing the executable instructions.

BRIEF DESCRIPTION OF THE DRAWINGS

The various objects, features and advantages of the present disclosure will become more apparent through considering the following detailed description of the preferred embodiments of the present disclosure in conjunction with the accompanying drawings. The accompanying drawings are only exemplary illustrate of the present disclosure and are not necessarily to scale. In the accompanying drawings, the same reference numerals generally refer to the same or similar components. In the accompanying drawings.

DETAILED DESCRIPTION

Figure 1:
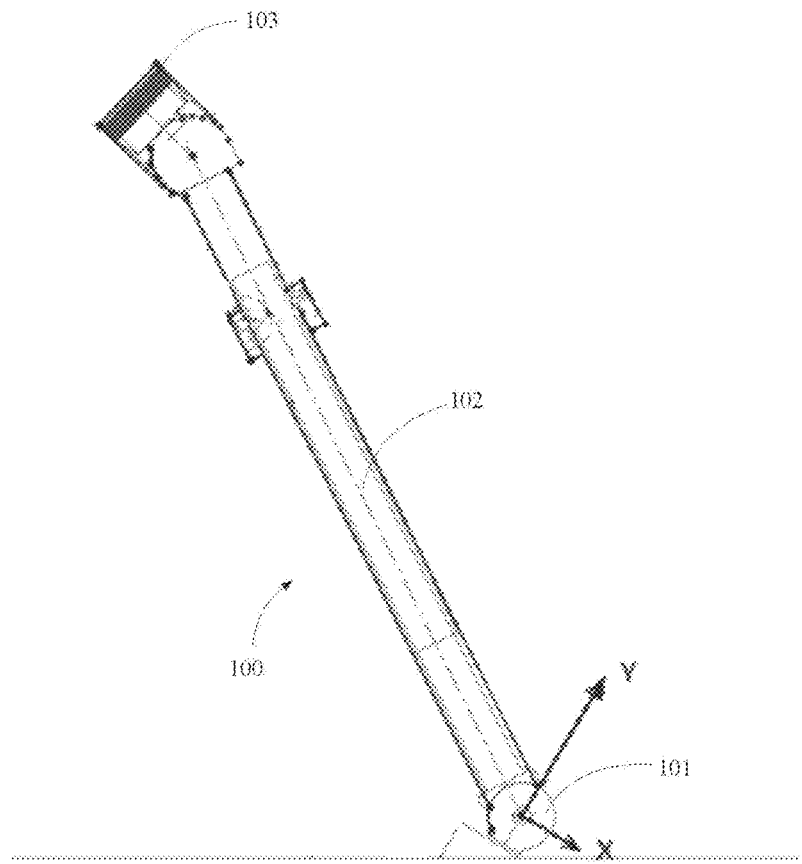
FIG. 1 is a schematic top view of a boarding bridge in an embodiment of the present disclosure.

Example embodiments will now be described more comprehensive with reference to the accompanying drawings. However, the example embodiments can be implemented via various manners, and should not be understood as being limited to the embodiments set forth herein. Conversely these embodiments are provided so that this disclosure will be comprehensive and complete, and the concepts of the example embodiments will be comprehensively communicated to those skilled in the art. The same reference numerals in the accompanying drawings denote the same or similar structures, and thereby their detailed descriptions will be omitted.

Referring to FIG. 1, a boarding bridge 100 includes a rotunda column, a rotunda 101, a telescoping tunnel 102, a bridgehead 103, an elevating mechanism, a walking mechanism, a plurality of cameras, and a control unit. The rotunda 101 may be installed on a terminal building, or may also be installed on a gallery communicating with the terminal building. The rotunda column is disposed at the bottom of the rotunda 101 for supporting the rotunda 101. The telescoping tunnel 102 is a stretchable passage, and the telescoping tunnel 102 is generally in a shape of a straight bar. One end of the telescoping tunnel 102 is installed on the rotunda 101, and the telescoping tunnel 102 is rotatably connected with the terminal building through the rotunda 101. A bridgehead 103 is installed on the other end of the telescoping tunnel 102. The bridgehead 103 may rotate relative to the telescoping tunnel 102. The walking mechanism is disposed below the telescoping tunnel 102, the elevating mechanism is arranged between the walking mechanism and the telescoping tunnel 102, and two ends of the elevating mechanism are respectively connected with the walking mechanism and the telescoping tunnel 102. The telescoping tunnel 102 is supported by the elevating mechanism, and the elevating mechanism can drive the telescoping tunnel 102 to swing up and down so as to raise or lower the bridgehead 103. The elevating mechanism may be a hydraulic elevating table. The walking mechanism is provided with wheels and a power device for driving the wheels to roll. The walking mechanism can walk on the ground to drive the telescoping tunnel 102 to stretch out and draw back in the horizontal direction, so as to drive the bridgehead 103 to move in the horizontal direction. The plurality of cameras may be installed on the bridgehead 103, and spaced apart from one another. The control unit is used to control the operation of the boarding bridge 100. The control unit may be a programmable logic controller, and may also be a computer.

Figure 2:
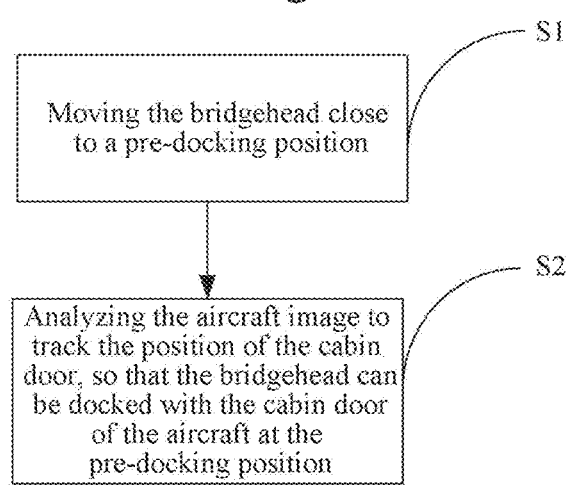
FIG. 2 is a flowchart of a method for docking a boarding bridge with an aircraft in an embodiment of the present disclosure.

Referring to FIG. 2, FIG. 2 shows a method for docking a boarding bridge with an aircraft. The boarding bridge may be automatically controlled by adopting this method to realize automatic docking with the aircraft. The method includes the following steps.

Step S1: planning a path of a bridgehead of a boarding bridge from a parking position of the boarding bridge to a pre-docking position 1 to 2 meters away from a cabin door of the aircraft, and driving the boarding bridge to move the bridgehead towards the pre-docking position along the path until the bridgehead moves to a position within 2 meters away from the pre-docking position.

The pre-docking position is located near the cabin door and is 1 to 2 meters away from the front of the cabin door. Firstly, a path from the position where the boarding bridge is parked to the pre-docking position is planned for the bridgehead, and then the bridgehead is driven automatically tracking by the path so that the bridgehead could reaches the position within 2 meters away from the pre-docking position along this path.

Step S2: acquiring an aircraft image of the aircraft, obtaining a spatial position of the cabin door according to the acquired aircraft image, and moving the boarding bridge according to the spatial position to enable the bridgehead to dock with the cabin door.

After the bridgehead reaches at the position within 2 meters away from the pre-docking position, the aircraft image(s) may be collected in a direction towards the cabin door of the aircraft via the plurality of cameras. After collecting the aircraft image(s), the accurate spatial position of the cabin door can be acquired by analyzing the aircraft image(s). The boarding bridge is controlled to move so that the bridgehead moves towards the cabin door until the bridgehead is docked with the cabin door of the aircraft.

Therefore, the bridgehead may be quickly moved to the position near the cabin door by tracking the path, and the cabin door is positioned by the visual positioning system after the bridgehead being close to the cabin door, so that the accurate spatial position of the cabin door can be acquired, and thus the bridgehead can be accurately docked with the cabin door.

Figure 3:
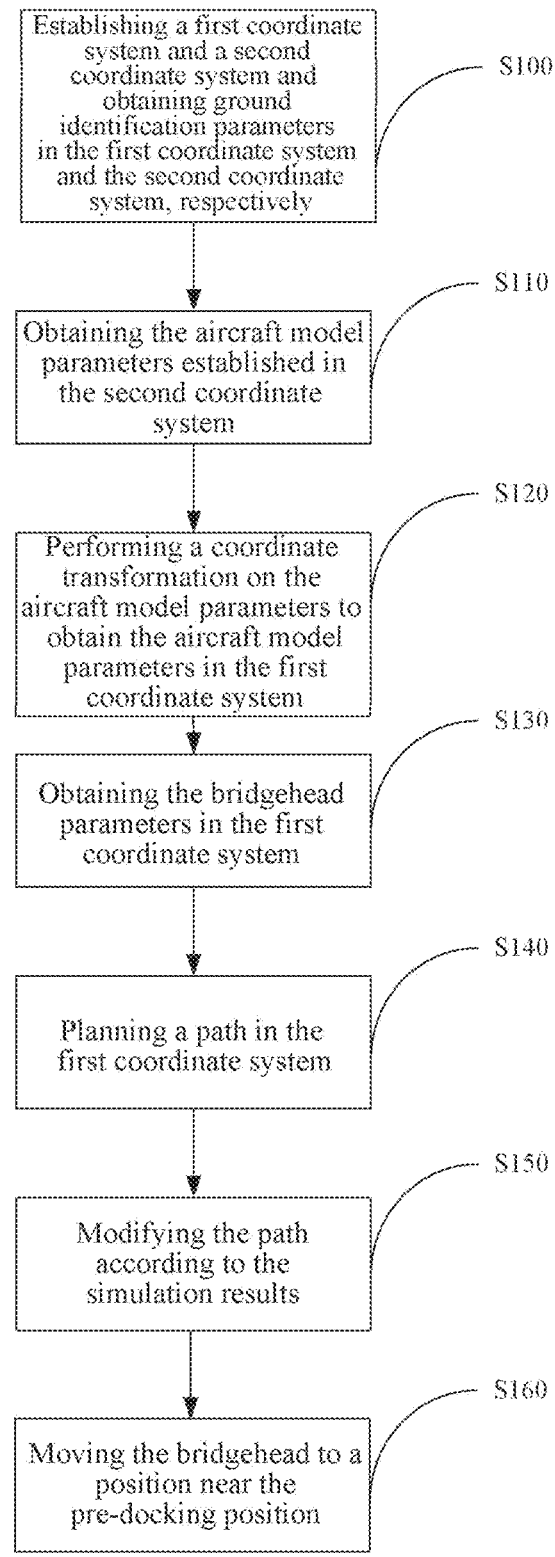
FIG. 3 is a flowchart of the boarding bridge reaching the pre-docking position in an embodiment of the present disclosure.

Referring to FIG. 3, step S1 includes steps S100 to S160.

Step S100: establishing a first coordinate system which is fixed relative to the ground and a second coordinate system which is fixed relative to the aircraft, and respectively obtaining ground identification parameters in the first coordinate system and the second coordinate system.

Figure 4:
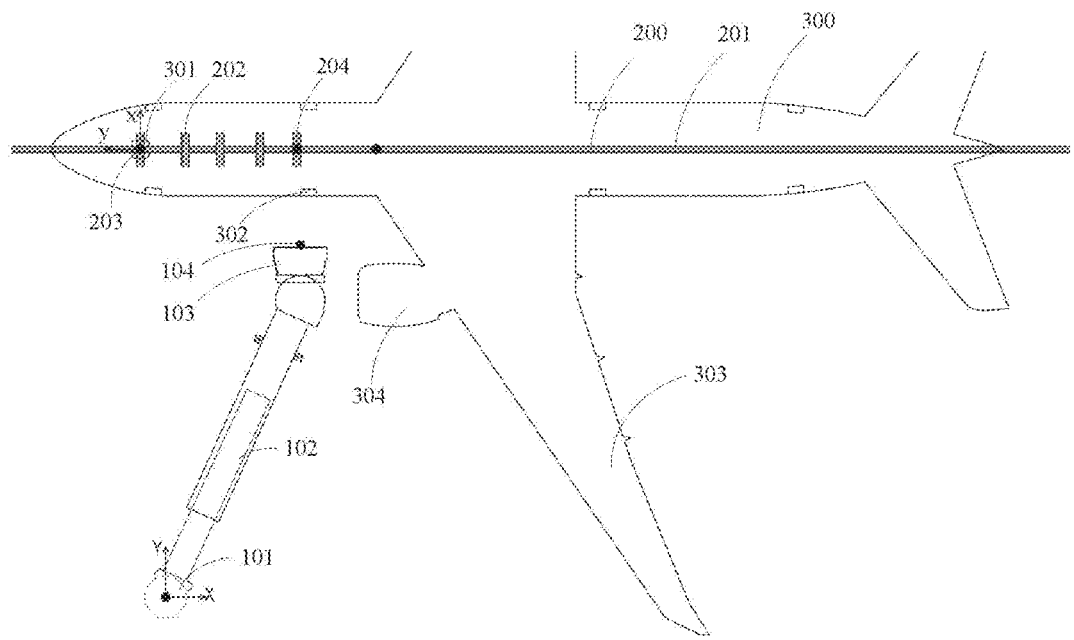
FIG. 4 is a schematic top view of an aircraft parked at a predetermined parking position in an embodiment of the present disclosure.

Where, coordinates of positions of a ground identification 200 and the bridgehead in the first coordinate system are known, and coordinates of the ground identification 200, the cabin door and anti-collision feature points in the second coordinate system are known. Referring to FIG. 4, a ground identification 200 is provided on the ground of the airport apron. The ground identification 200 is used to guide the aircraft 300 to dock at a predetermined parking position. The ground identification 200 may be a pattern formed by a plurality of parking lines 202 intersecting with a guide line 201, and each of the parking lines 202 is perpendicular to the guide line 201. The guide line 201 is used to guide the aircraft 300 to drive on the airport apron along a predetermined route. The parking lines 202 are used to indicate a docking position of the aircraft 300. The nose wheel 203 of the aircraft 300 is located at the intersection of the designated parking line 202 and the guide line 201, moreover, when the longitudinal axis of the aircraft 300 is approximately parallel to the guide line 201, the aircraft 300 is docked at a predetermined parking position, when the accuracy deviation range of the parking position is within an allowable error range of the airport, the aircraft parking position is qualified. The allowable error range is: a deviation absolute value of the axis centerline of the nose wheel 203 and the centerline of the parking line 202 is less than 0.5 meters, the deviation absolute value of the axis midpoint of the nose wheel 203 and the centerline of the aircraft guide line 201 is less than 0.3 meters, and the angle between the longitudinal axis of the aircraft 300 and the centerline of the guide line 201 of the aircraft is less than 2 degrees.

The first coordinate system or the second coordinate system may be a rectangular coordinate system or a spherical coordinate system. In this embodiment, both the first coordinate system and the second coordinate system are rectangular coordinate systems.

The first coordinate system includes an X-axis, a Y-axis, and a Z-axis, wherein the X-axis and the Y-axis may be parallel to the ground and the Z-axis may be perpendicular to the ground with a positive direction facing upward. The Z-axis may be coaxial with the axis of the rotunda 101. The origin may be provided on the ground.

After the first coordinate system is established, the ground identification parameters of the ground identification 200 in the first coordinate system can be obtained through a method of direct measurement. In this embodiment, the ground identification 200 is characterized by two identification feature points. The two identification feature points are a first identification feature point 203 and a second identification feature point 204 respectively, the first identification feature point 203 is an intersection of the centerline of the first parking line 202 and the centerline of the guide line 201, and the second identification feature point 204 is an intersection of the centerline of the last parking line 202 and the centerline of the guide line 201. The ground identification parameters include coordinates of the first identification feature point 203 and the second identification feature point 204 in a first coordinate system.

The ground identification parameters further include coordinates of a first identification feature point 203 and a second identification feature point 204 in the second coordinate system. The second coordinate system includes an x-axis, a y-axis, and a z-axis. Both the x-axis and the y-axis are parallel to the ground. The z-axis is perpendicular to the ground and the positive direction thereof is perpendicular to the ground. The x-axis of the second coordinate system may be perpendicular to the guide line 201 and the y-axis of the second coordinate system may be parallel to the guide line 201. The origin of the second coordinate system is provided at the first identification feature point 203 which is located on the guide line 201 and the parking line 202, and the second identification feature point 204 passes through the y-axis. The coordinate of the second identification feature point 204 can be obtained by measuring a distance between the first identification feature point 203 and the second identification feature point 204.

Since the ground identification parameters in the first coordinate system and the second coordinate system are obtained, conditions are provided for coordinate conversion between the first coordinate system and the second coordinate system at any point.

Step S110: obtaining the aircraft model parameters established in the second coordinate system.

The aircraft model is pre-established in the second coordinate system and is represented by coordinates in the second coordinate system. Different types of aircraft models may be built for different types of aircraft 300. When establishing the aircraft model, the ground identification 200 is used as a reference to obtain the model parameters for simulating the aircraft when the aircraft 300 is parked at a predetermined parking position. In this way, the relative positional relationship between the ground identification 200 and the aircraft model is determined.

Figure 5:
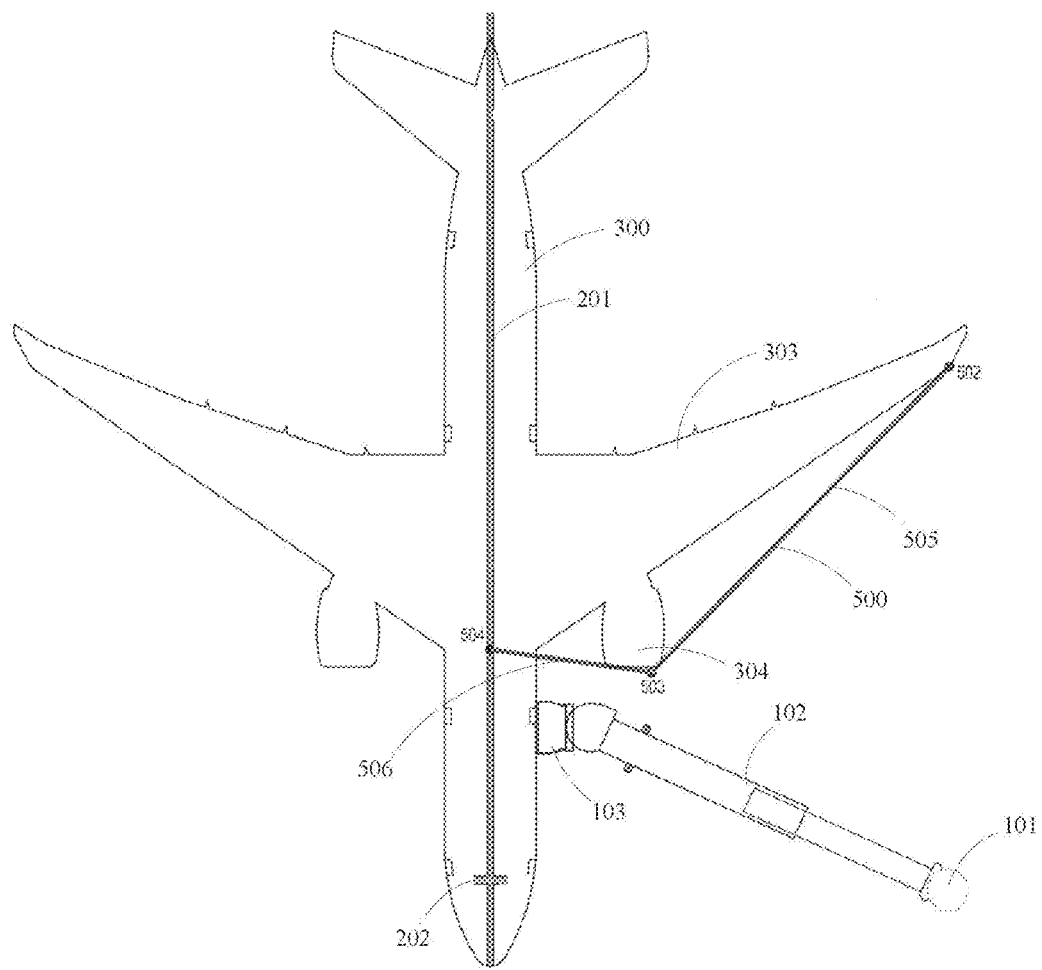
FIG. 5 is a schematic top view of a anti-collision line of the wing in an embodiment of the present disclosure.
Figure 6:
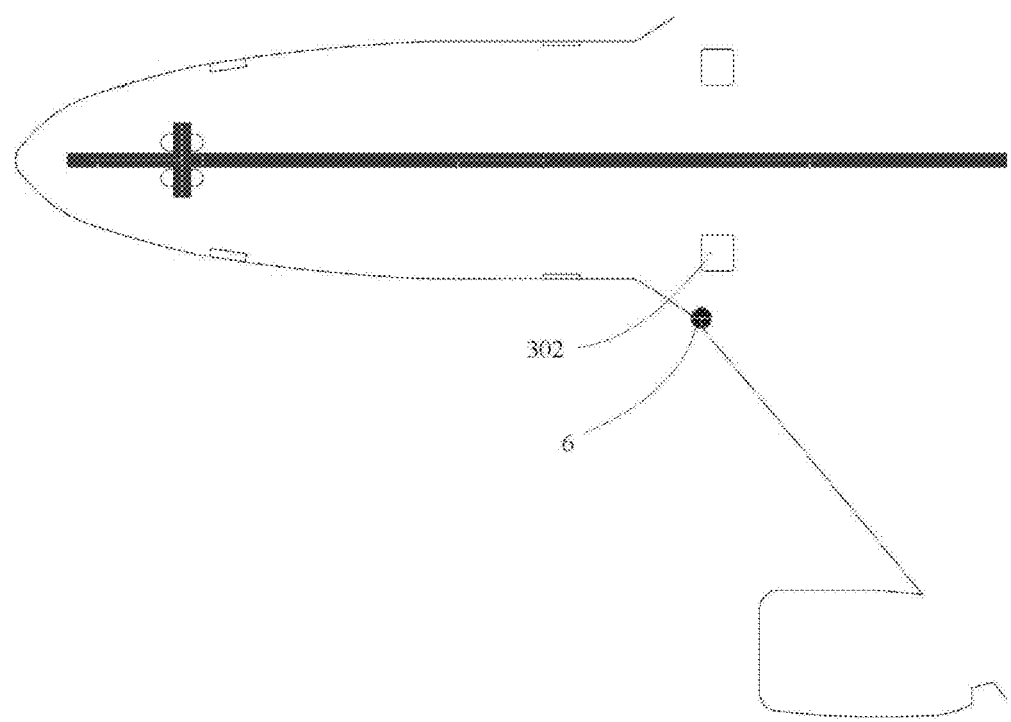
FIG. 6 is a partial schematic view of an aircraft in an embodiment of the present disclosure.

Referring to FIG. 5 and FIG. 6, the aircraft model parameters include the coordinates of a cabin door feature point 6 and a plurality of anti-collision feature points 502, 503, 504 in the second coordinate system. The cabin door feature point 6 is used to characterize the position of the cabin door 302. The cabin door feature point 6 may be a point on the cabin door 302 or near the cabin door 302. In this embodiment, the feature of the cabin door point 6 is 15 cm below the door seam at a side of a rotating shaft of the cabin door 302.

Acquiring a preset anti-collision line 500 of the wing 303. The process of acquiring the anti-collision line 500 of the wing 303 includes: calculating coordinates of the anti-collision feature points 502, 503, 504 in the first coordinate system according to the coordinates of the ground identification 200 in the first coordinate system and the second coordinate system and coordinates of the anti-collision feature points 502, 503, 504 in the second coordinate system, and connecting the anti-collision feature points 502, 503, 504 so that the anti-collision line of the wing 303 is acquired. The anti-collision line 500 of the wing 303 is a virtual line provided between the wing 303 of the aircraft 300 and the boarding bridge 100. The anti-collision line 500 of the wing 303 is a line preset in the system, and the anti-collision line 500 of the wing 303 matching the outline of the wing 303 may be provided according to different aircraft types. The anti-collision line 500 of the wing 303 is used to limit the boarding bridge 100 in order to avoid collision of the boarding bridge 100 with the wing 303. If the outer contour of boarding bridge 100 touches the anti-collision line 500 of the wing 303, it indicates that the boarding bridge 100 has a risk of colliding with the wing 303.

The plurality of anti-collision feature points 502, 503 and 504 are connected in sequence through straight lines to obtain the anti-collision line 500 of the wing 303. The coordinates of the plurality of anti-collision feature points 502, 503, 504 are used to characterize the position and shape of the anti-collision line 500 of the wing 303. In this embodiment, the anti-collision line 500 of the wing 303 includes a first line segment 505 and a second line segment 506. The first line segment 505 extends from a front position of a tail end of the wing 303 to the front of the engine 304 closest to the cabin door 302, and the second line segment 506 extends from an end of the first line segment 505 near the cabin door 302 to a side of the cabin door 302 away from the aircraft nose. Among them, the first line segment 505 is located in front of all of engines 304 at the side of the cabin door 302. In this embodiment, there are three anti-collision feature points, i.e., a first anti-collision feature point 502 is located in front of the tail end of the wing 303, a second anti-collision feature point 503 is located in front of the engine 304 closest to the cabin door 302, and a third anti-collision feature point 504 is located at a side of the cabin door 302 facing away from the aircraft nose, and these three anti-collision feature points are sequentially connected to obtain the anti-collision line 500 of the wing 303. The first segment 505 and the second segment 506 of the anti-collision line 500 of the wing 303 are preferably both tangential to the outer contour of the engine 304.

Step S120: performing a coordinate transformation on the aircraft model parameters according to the ground identification parameters in the first coordinate system and the second coordinate system to obtain the aircraft model parameters in the first coordinate system.

Since the parameters of the ground identification 200 in the first coordinate system and the second coordinate system are obtained in advance, i.e., the coordinate of the first identification feature point 203 in the first and second coordinate systems and the coordinate of the second identification feature point 204 in the first and second coordinate systems are obtained in advance, and the Z-axis of the first coordinate system and the z-axis of the second coordinate system are parallel to each other, the coordinates of the cabin door feature point 6 and the multiple anti-collision feature points 502, 503, and 504 in the second coordinate system can be transformed to obtain the coordinates of the cabin door feature point 6 and the multiple anti-collision feature points 502, 503, and 504 in the first coordinate system. So that the aircraft model parameters are transformed to the first coordinate system.

Step S130: obtaining the bridgehead parameters in the first coordinate system.

The boarding bridge 100 is parked in a safety region before docking with the aircraft. The bridgehead parameters may be obtained by measuring the bridgehead 103. The bridgehead parameters include the coordinate of the bridgehead feature point 104 in the first coordinate system. The bridgehead feature point 104 may be a midpoint of the bumper of the bridgehead 103. The bridgehead feature point 104 and the cabin door feature point 6 correspond to each other, and the bridgehead 103 is aligned with the cabin door 302 when the bridgehead feature point 104 and the feature of the cabin door 6 are closer to each other.

In this way, the bridgehead 103 and the aircraft model are unified into the first coordinate system.

Figure 7:
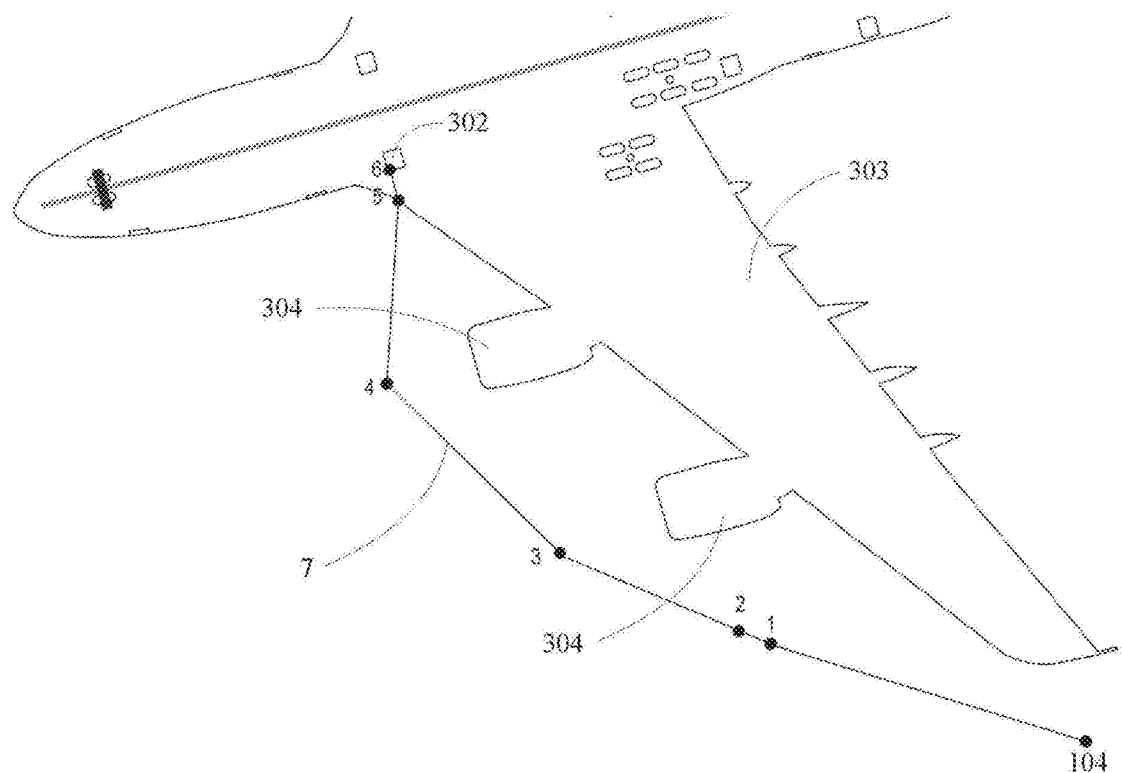
FIG. 7 is a schematic top view of a path in an embodiment of the present disclosure.

Step S140: referring to FIG. 7, planning a path 7 for the bridgehead 103 of the boarding bridge moves from the parking position to the pre-docking position in the first coordinate system according to the bridgehead parameters and the aircraft model parameters in the first coordinate system.

Acquiring a pre-docking position and a position at which the bridgehead is located when the boarding bridge is at the parking position, and generating a path 7 for connecting the two positions. The pre-docking position is represented by a pre-docking point 5. When the bridgehead feature point 104 reaches the pre-docking point 5, it indicates that the bridgehead 103 reaches the pre-docking position. The path 7 may be planned according to the shortest path principle. One end of the path 7 is connected to the position of the bridgehead feature point 104 when the boarding bridge is in the parking position, and the other end of the path 7 is connected to the pre-docking point 5. The bridgehead feature point 104 travels along this path 7 to reach the pre-docking point 5. The process of acquiring the pre-docking position includes: calculating the coordinate of the cabin door 302 in the first coordinate system according to coordinates of the ground identification 200 in the first coordinate system and the second coordinate system and the coordinate of the cabin door 302 in the second coordinate system, and calculating a coordinate of a pre-docking point according to the coordinate of the cabin door 302 in the first coordinate system.

The distance between the pre-docking point 5 and the cabin door feature point 6 is within a range of 1-2 meters, and the distance between the pre-docking point 5 and the cabin door feature point 6 is preferably 1.5 meters. The connecting line between the pre-docking point 5 and the feature of the cabin door point 6 is perpendicular to the cabin door.

When the bridgehead 103 of the boarding bridge 100 is operated to a position within 2 meters away from the pre-docking point 5, the boarding bridge 100 may switch the visual positioning system to identify the cabin door 302 and guide the bridgehead 103 of the boarding bridge 100 to continuously approach the cabin door 302, so that the alignment of the bridgehead 103 and the cabin door 302 is more accurate.

Step S150: simulating the process of the boarding bridge 100 moving to the pre-docking position along the path 7, and adjusting at least a part of the path 7 in front of an engine 304 in a direction radially away from the engine 304 if interference is formed between the anti-collision line 500 of the wing 303 and an outer contour of the boarding bridge 100 during simulation, and then simulating again until there is no more interference formed between the anti-collision line 500 of the wing 303 and the outer contour of the boarding bridge 100.

In this way, the finally formed path 7 can be used as the path 7 along which the boarding bridge 100 travels, and the bridgehead 103 of the boarding bridge 100 can travel along the path 7 without collision between the boarding bridge 100 and the wing 303.

The step S150 includes steps S151 to S154.

Step S151: establishing an outer contour model of the boarding bridge 100 in the first coordinate system.

Step S152: simulating the process of the bridgehead 103 moving to the cabin door 302 along the path 7, and judging whether the outer contour model of the boarding bridge 100 and the anti-collision line 500 of the wing 303 interfere with each other in this process, specifically, if so, performing the step S153 for adjusting the path 7, or otherwise, performing the step S154;

Step S153: moving a part of the path 7 in front of the engine 304 in a direction away from the engine 304, and proceeding to step S152.

Since the engine 304 protrudes from the front of the wing 303, moving a part of the path 7 in front of the engine 304 away from the engine 304 can further prevent the engine 304 and a part of the wing 303 near the engine 304 from colliding with the boarding bridge 100.

Step S154: outputting the path 7.

Preferably, a first inflection point 4 is added on the path 7 while the path 7 is being adjusted. The first inflection point 4 is located in front of the engine 304 closest to the cabin door 302 and at least 1.5 meters away from the engine 304. The path 7 at this moment is a line connected in sequence by the bridgehead feature point 104 when the boarding bridge is at the parking position, the first inflection point 4 and the pre-docking point 5

After the first inflection point 4 is added, the distance between the outer contour of the boarding bridge 100 and the engine 304 closest to the cabin door 302 increases when the boarding bridge 100 moves, and the outer contour of the boarding bridge 100 can be effectively prevented from colliding with the engine 304. The first inflection point 4 is more preferably located in front of the side of the engine 304 near the cabin door 302 side.

More preferably, the second inflection point 3 is added on the path 7 when the path 7 is adjusted. The second inflection point 3 is located in front of the engine 304 which is on the same side of the cabin door 302 but furthest from the cabin door 302, and the second inflection point 3 is at least 1.5 meters away from this engine 304. The path 7 at this time is a line connected in sequence by the bridgehead feature point 104 when the boarding bridge is at the parking position, the second inflection point 3, the first inflection point 4, and the pre-docking point 5.

After the second inflection point 3 is added, since the first inflection point 4 and the second inflection point 3 are respectively located in front of two engines 304, and one of the two engines 304 is close to the cabin door 302 and the other is away from the cabin door 302. The distance between the outer contour of the boarding bridge 100 and all the engines 304 is increased when the boarding bridge 100 moves, and thus the outer contour of the boarding bridge 100 can be effectively prevented from colliding with all the engines 304. The second inflection point 3 is preferably located in front of the side of the engine 304 away from the cabin door 302.

Preferably, a third inflection point 2 is added on the path 7 when the path 7 is adjusted. The third inflection point 2 is located in front of the tail end of the wing 303 and at least 1.5 meters away from the wing 303. The path 7 at this time is a line connected in sequence by the bridgehead feature point 104 when the boarding bridge is at the parking position, the third inflection point 2, the second inflection point 3, the first inflection point 4, and the pre-docking point 5.

After the third inflection point 2 is added, the third inflection points 2 are respectively located at least 1.5 meters in front of the tail end of the wing 303. the distance between the outer contour of the boarding bridge and the tail end of the wing 303 is increased when the boarding bridge 100 moves, and the outer contour of the boarding bridge 100 can be effectively prevented from colliding with the tail end of the wing 303.

Preferably, a pre-parking point 1 is also provided on the path 7. It is usually necessary to delimit a safety zone for the boarding bridge. The boarding bridge can move in the safety zone without causing interference to the operation of the aircraft 300 or other equipment. The pre-parking point 1 is disposed at the edge of the safety zone and near the parking position of the aircraft 300. The path 7 at this time is a line connected in sequence by the bridgehead feature point 104 when the boarding bridge is at the parking position, the pre-parking point 1, the third inflection point 2, the second inflection point 3, the first inflection point 4 and the pre-docking point 5.

The bridgehead 103 of the boarding bridge 100 may reach the pre-parking point 1 from a starting point of the path 7 in advance before the aircraft 300 arrives at its parking position, and the boarding bridge 100 starts from the pre-parking point 1 after the aircraft 300 arrives at its parking position can achieve docking with the aircraft faster, thus improve the docking efficiency.

Step S160: driving the boarding bridge 100 so that the bridgehead 103 is moved to a position within 2 meters away from the pre-docking position along the path 7.

In this step, the walking mechanism and the elevating mechanism of the boarding bridge 100 cooperate with each other to move the bridgehead 103 so that the bridgehead feature point 104 on the bridgehead 103 can move along the path 7.

The minimum distance between the outer contour of the boarding bridge 100 and the anti-collision line 500 of the wing 303 is calculated in real time in the moving process of the boarding bridge 100, and if the minimum distance is smaller than a first preset value and larger than a second preset value, the moving speed of the boarding bridge is reduced, for example, the moving speed of the boarding bridge is reduced to 10% of the maximum speed of the boarding bridge. The second preset value is smaller than the first preset value, a value range of the second preset value may be from 0.5 to 0.8 m, and a value range of the first preset value may be from 1 to 2 m. If the minimum distance between the outer contour of the boarding bridge 100 and the anti-collision line 500 of the wing 303 is below the second preset value, the boarding bridge stops moving and sends an alarm.

Figure 8:
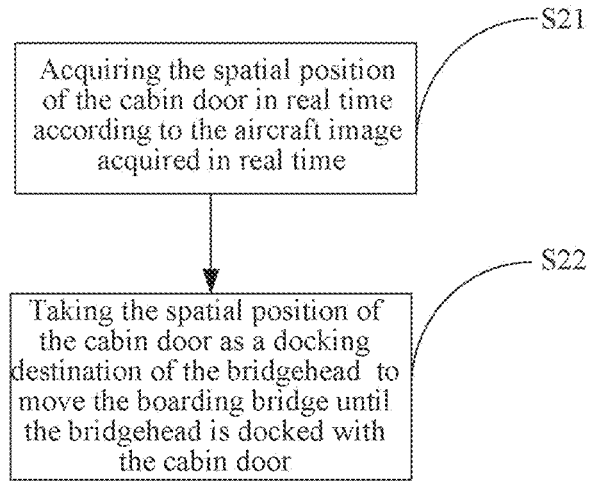
FIG. 8 is a flowchart of the boarding bridge docking with an aircraft from a pre-docking position in an embodiment of the present disclosure.

Further, referring to FIG. 8, the step S2 includes steps S21 and S22.

Step S21: acquiring the aircraft image in real time in a process of the bridgehead moving from a position within 2 meters away from the pre-docking position to a position where the bridgehead can be docked with the cabin door, and updating a spatial position of the cabin door in real time according to the acquired aircraft image.

Step S22: moving the boarding bridge with the newly acquired spatial position of the cabin door as a docking destination of the bridgehead until the bridgehead is docked with the cabin door.

When the bridgehead reaches the position where the distance between the bridgehead and the pre-docking position is less than 2 meters, aircraft images are collected in real time through the plurality of cameras, at this time, the distance between the bridgehead and the cabin door is less than 3.5 meters, and the aircraft images contain clear cabin door patterns when the plurality of cameras take pictures of the aircraft. The aircraft image is analyzed to obtain the spatial position of the cabin door, and the spatial position of the cabin door can be obtained in real time by collecting and analyzing the aircraft image in real time in the process that the bridgehead moves to dock with the cabin door from the pre-docking position. When the spatial position obtained in real time acts as the docking destination of the bridgehead, the more accurate spatial position of the cabin door can be continuously obtained in the process that the bridgehead moves to dock with the cabin door from the pre-docking position, and posture and movement direction of the boarding bridge are adjusted according to the spatial position, so that the docking can be more accurate.

Figure 9:
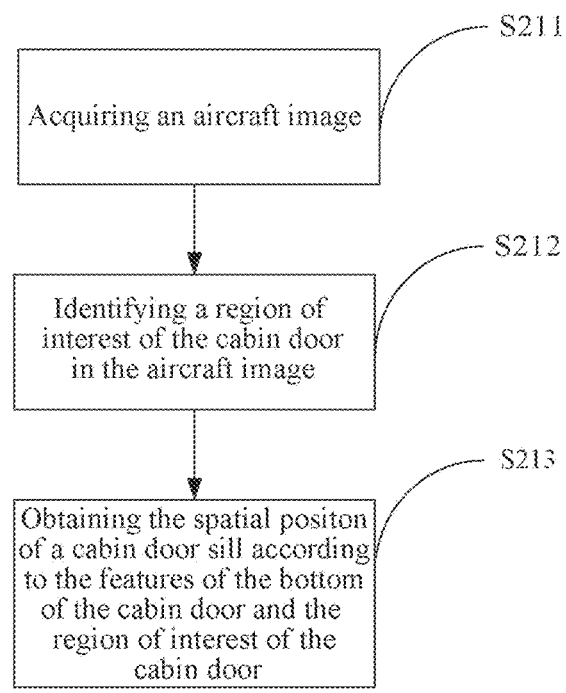
FIG. 9 is a flowchart for obtaining a region of interest of the cabin door from an aircraft image in an embodiment of the present disclosure.

Further, referring to FIG. 9, the step S21 includes:

Step S211: acquiring an aircraft image;

Step S212: identifying a region of interest (ROI) of the cabin door in the aircraft image according to features of the cabin door; and Step S213: obtaining the spatial position of a cabin door sill according to the features of the bottom of the cabin door and the region of interest of the cabin door.

The region of interest of the cabin door in the aircraft image is identified according to the features of the cabin door, and a cabin door frame in the aircraft image is identified according to the features of the bottom of the cabin door in the region of interest of the cabin door. The spatial position of the cabin door sill can be calculated according to the position of the cabin door sill in the aircraft image and the spatial position of the camera for collecting the aircraft image. Identification of the cabin door is achieved via the machine vision, thereby avoiding the problem of poor universality caused by the fact that special mark needs to be provided on an aircraft when the cabin door is identified. The accurate positioning of the cabin door facilitates fully automatic docking of the boarding bridge with the aircraft.

In step S211, an aircraft image is acquired.

Where, the target aircraft image may be acquired via an imaging system, which may include imaging instruments, such as a plurality of cameras and light sources, and image acquisition devices, such as image acquisition cards, and the like. The imaging system may rapidly and stably collect images within a designated region in a designated application scene, for example, an image at a side of an aircraft in which the cabin door is installed can be obtained. When the aircraft image is obtained, the image at the side of the aircraft in which the cabin door is installed can be continuously and dynamically captured, for example, by making a video for the image at the side of the aircraft in which the cabin door is installed, and optionally, the image at a side of the aircraft in which the cabin door is installed may be discretely and dynamically obtained, for example, the aircraft image is taken once at designated intervals, the embodiments of the present disclosure do not specifically limit this.

In step S212, a region of interest of the cabin door in the aircraft image may be identified according to the features of the cabin door.

The features of the cabin door may be dimensions of the cabin door, such as a shape, a length, a height, and the like of the cabin door. The data of the features of the cabin door is preset data. The region of interest of the cabin door may be a region in the image that matches with the region of the cabin door, which may be a region of the cabin door in the image, or a region in the image that is within the tolerance of the error.

Figure 10:
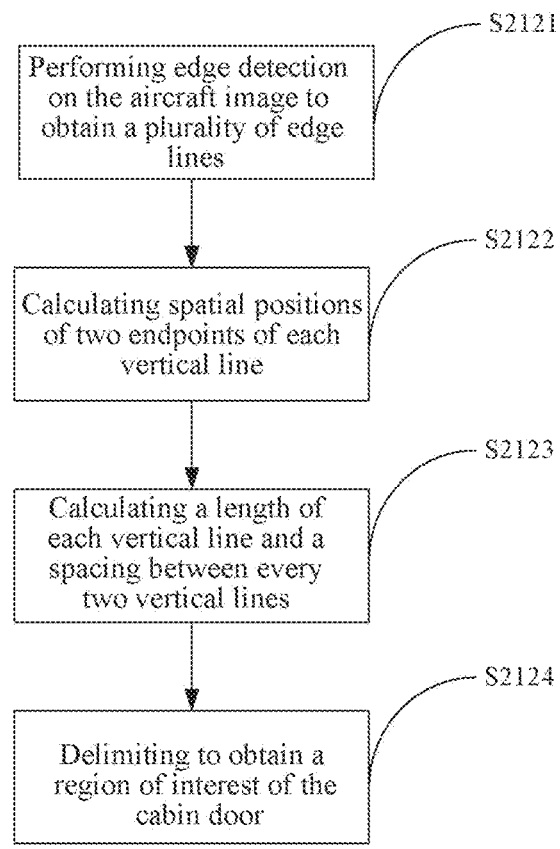
FIG. 10 is a flowchart of identifying a region of interest of the cabin door in an aircraft image in an embodiment of the present disclosure.

Further, referring to FIG. 10, the step S212 includes steps S2121 to S2124:

Step S2121: performing edge detection on the aircraft image to obtain a plurality of edge lines.

The imaging system is usually installed on the boarding bridge, and moves together with the boarding bridge, when the identification is started, the boarding bridge is far away from a target aircraft, and the target aircraft image acquired by the imaging system includes the whole region of the cabin door. The cabin doors are typically provided with different coatings to form the cabin door profile and a stainless steel sill is provided at the bottom of the cabin door, there is a door seam between the cabin door and the aircraft fuselage, and edges of the above features form lines with specific dimensions in the image.

Figure 11:
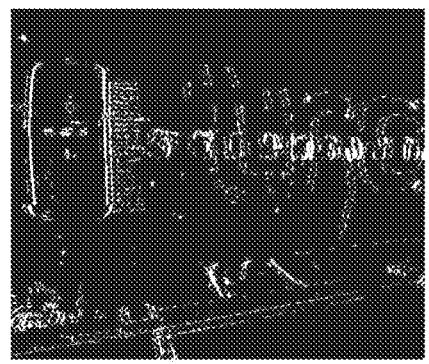
FIG. 11 is a schematic view of extracting lines from an aircraft image in an embodiment of the present disclosure.

Based on the above features, edge detection may be performed on the target aircraft image, for example, the edge detection is performed on the aircraft image by using methods such as a canny operator or a Sobel operator, and a plurality of lines including edge lines of the cabin door shown in FIG. 11 are obtained by edge detection and binarization.

In step S2122, extracting vertical lines extending in the vertical direction are from the plurality of edge lines, and calculating spatial positions of two endpoints of each vertical line.

Figure 12:
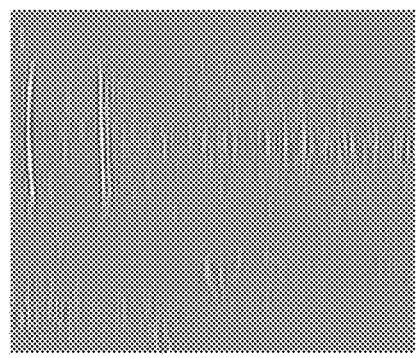
FIG. 12 is a schematic view of extracting vertical lines from an aircraft image in an embodiment of the present disclosure.

In practical applications, the plurality of lines obtained in step S2121 includes cabin door lines and other interference lines, and thus excessive lines are not favorable for analysis. Thus, the vertical lines extending in the vertical direction may be extracted for convenience of analysis. Referring to FIG. 12, generally included in the aircraft image are mainly horizontal lines and vertical lines, and thus extracting the vertical lines may be implemented by filtering out the horizontal lines. The filtering of the horizontal lines can be realized by using a Sobel operator, and certainly, the method for extracting the vertical lines in practical application may also be other methods, which is not limited in the embodiments of the present disclosure.

The spatial positions of the two endpoints of each vertical line may be calculated by a multi-view visual triangulation calculation method. A third coordinate system which is relatively fixed with the bridgehead is established, and coordinates of the two endpoints of the vertical line in the third coordinate system are calculated.

Step S2123: calculating a length of each vertical line and a spacing between every two vertical lines according to the spatial positions of the two endpoints of each vertical line;

When the spatial positions of two endpoints of each vertical line are known, the length of each vertical line may be calculated by calculating the spacing between these two endpoints, and certainly, in order to improve the calculation efficiency, the length of each vertical line may be estimated roughly by a priori knowledge without accurately calculating the spatial positions of the two endpoints. Meanwhile, since the vertical lines are parallel to each other, the spacing between every two vertical lines may be calculated according to the spatial positions of the endpoints.

Step S2124: delimiting a region between two vertical lines in the aircraft image as a region of interest of the cabin door when lengths of two of the plurality of vertical lines are matched with a length of the cabin door, and the spacing between the two vertical lines is matched with a width of the cabin door.

The length of the cabin door in the vertical direction is compared with the lengths of the plurality of vertical lines, and the width of the cabin door in the horizontal direction is compared with the spacing between any two of the plurality of vertical lines;

The region between two vertical lines in the aircraft image is delimited as a region of interest of the cabin door when lengths of two of the plurality of vertical lines are matched with a length of the cabin door in the vertical direction, the spacing between the two vertical lines is matched with a width of the cabin door in the horizontal direction, and a ratio of the lengths of the two vertical lines to the spacing between the two vertical lines is matched with a ratio of the length to the width of the cabin door. The length matching means that the lengths are the same or the length difference is within a threshold range, for example, the spacing deviation is less than 200 mm, and the height deviation is less than 500 mm.

Step S213: obtaining the spatial position of the cabin door sill according to the features of the bottom of the cabin door and the region of interest of the cabin door. The step S213 includes steps S2131 to S2132.

Step S2131: identifying a frame of the cabin door in the region of interest of the cabin door according to the features of the bottom of the cabin door;

The bottom of the cabin door has more features including cabin door coating marks, door seams with corners, stainless steel sills and the like, and the features may be identified within the region of interest of the cabin door in the aircraft image, so that the position of the frame of the cabin door in the aircraft image can be determined.

The step S2131 includes steps S2131a to S2131c,

Step S2131a: identifying a cabin door sill in the region of interest of the cabin door, and marking a top center point of the cabin door sill as an identification point;

Step S2131b: searching door seam lines in the image at two sides of the identification point; and Step S2131c: acquiring an intersection of a horizontal line and a vertical line of the door seam lines as an endpoint of the cabin door sill.

Figure 13:
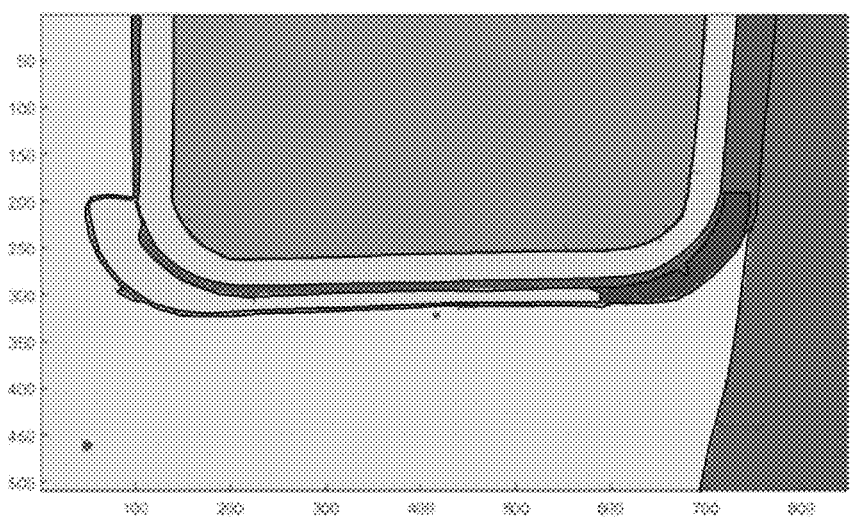
FIG. 13 is a schematic view of a plurality of enclosed regions provided by an exemplary embodiment of the present disclosure.

In step S2131a, the cabin door sill may be identified in the region of interest of the cabin door by edge detection. Before the edge detection, part of the noise and some small unnecessary details can be eliminated in the region of interest of the cabin door by the mean-shift filter algorithm of open-cv, and then edge detection is performed by canny operator. The edge detection may obtain a plurality of regions, for example, a plurality of enclosed regions as shown in FIG. 13, and the plurality of enclosed regions may be filled with colors during the detection process, so as to distinguish the regions. Of course, the edge may also be detected by other edge detection operators, and the embodiments of the present disclosure are not limited thereto.

The lowest region is selected from the detected enclosed regions, where, the region is in the region of interest of the cabin door and meets certain size requirements, for example, the width of the enclosed region is not less than 400 pixels. At this time, the enclosed region is a sill region, the upper edge of the enclosed region is the lower door seam line, the center point of the upper edge is marked as an identification point, and the upper, the lower, the horizontal, the vertical, the upper edge, the lower edge and the like in the embodiment of the present disclosure refer to orientations of the aircraft in a state of parking at the airport.

In step S2131b, the door seam lines are searched in the image at both sides of the identification point.

During the door seam search, searching along a line with the highest contrast at two sides of the identification point on the upper edge of the sill region of the cabin door, calculating the maximum contrast difference of each point on the edge obtained by edge detection, and selecting the point with the contrast and the direction conforming to the features of the door seam.

In the process of searching the door seam, a sequence of traversing points of the region to be searched may be determined according to an extending direction of the simulated quadratic Bezier curve. The quadratic Bezier curve may be described by using two parameters, i.e., a direction "forward" and an offset "side", wherein thresholds of "forward" and "side" may be selected according to actual conditions in actual application.

For example, forward ∈[0, 5], side ∈[0, 5], the expression of the quadratic Bezier curve is as follows:

$$B(t)=po+t\text{forward}+t^2\text{side}$$

wherein t is a parameter of the quadratic Bezier curve, t∈(0, 1), po is a detection point D0, another detection point D2 is po+forward+side, the control point D1 is po+0.5side.

Figure 14:
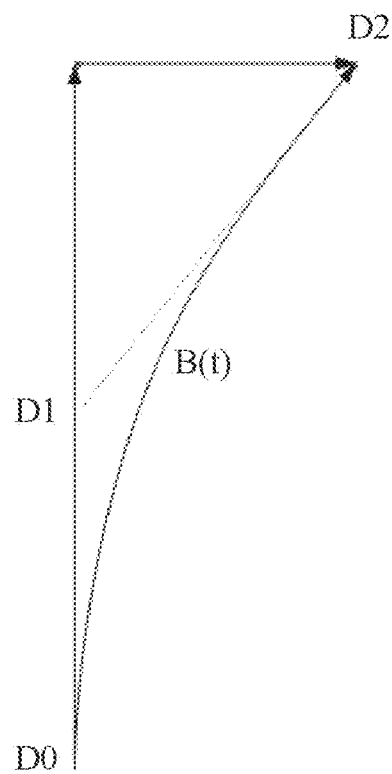
FIG. 14 is a schematic view of a quadratic Bezier curve provided by an exemplary embodiment of the present disclosure.

As shown in FIG. 14, the detected edge line is divided into a plurality of line segments D0 to D2, a quadratic Bezier curve as described above is constructed, and points that match the features of the door seam are searched in the edge lines, the points are selected as points that meet requirements of the door seam.

In step S2131c, an intersection of a horizontal line and a vertical line in the door seam line can be obtained as an endpoint of the cabin door sill.

Figure 15:
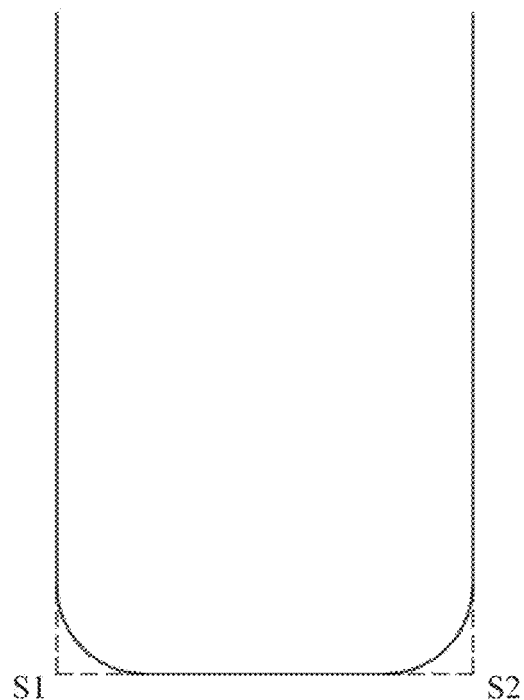
FIG. 15 is a schematic view of a door seam provided by one exemplary embodiment of the present disclosure.

The door seam shown in FIG. 15 may be obtained by the step S2131b, the door seam includes horizontal and vertical lines, and an intersection point between the horizontal and the vertical lines can be obtained through a linear fitting manner, and each of two vertical lines has an intersection point with the horizontal line, and two intersection points S1 and S2 act as endpoints of the cabin door sill, and two endpoints may act as identification points for automatic docking of the boarding bridge.

Step S2132: acquiring the spatial position of the frame of the cabin door according to a position of the frame of the cabin door in the aircraft image.

The spatial positions of two endpoints of the cabin door sill of the aircraft may be calculated by a multi-view visual triangulation method, i.e., three-dimensional coordinates of the endpoints in the third coordinate system. The multi-view visual triangulation method is based on parallax, and three-dimensional information may be acquired by a triangulation principle, i.e., a triangle is formed between an image plane of two or more cameras and a measured object. When positions of two or more cameras in the third coordinate system are known, three-dimensional dimensions of the object in the common field of view of the cameras and the three-dimensional coordinate of feature points of the spatial object in the third coordinate system can be obtained. In step S22, when the bridgehead docks with (abuts against) the cabin door, the midpoint of the bumper of the bridgehead is aligned to a position that is 15 cm below the above two endpoints, and the bridgehead can completely cover the region of the aircraft cabin door, i.e., the docking between the bridgehead and the cabin door is completed.

Figure 16:
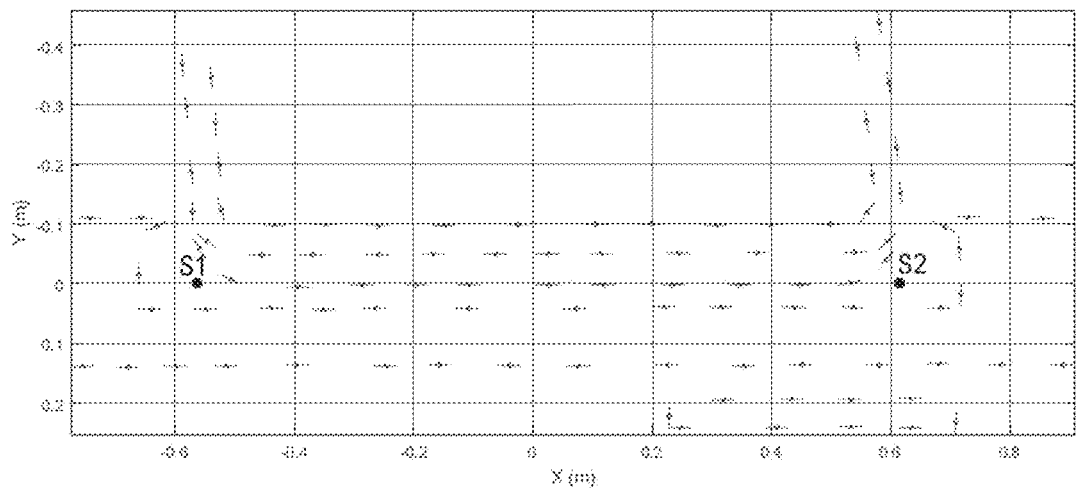
FIG. 16 is a schematic view of a bottom model of the cabin door in an embodiment of the present disclosure.

Further, since the docking of the boarding bridge with the aircraft cabin door is a dynamic process, in the process of identifying the aircraft cabin door, dynamical identification can be performed, and the accuracy of identifying the aircraft cabin door can be ensured by continuous correction. The method for identifying the aircraft cabin door may also include the following steps:

Step S214: acquiring a bottom region of the cabin door containing the cabin door sill according to the position of the cabin door sill in the aircraft image, and establishing a bottom model of the cabin door according to the bottom region of the cabin door;

The bottom region of the cabin door is a region containing the cabin door sill in the aircraft image, and the region is slightly larger than a coverage range of the cabin door sill in the aircraft image. Since edge features of the bottom of the cabin door are very obvious, the bottom model of the cabin door is established by adopting the edge intensity and the edge direction, and it may be achieved in a self-learning way. The bottom model of the cabin door may be as shown in FIG. 16.

When the bottom model of the cabin door is established, the region near the sill in the images acquired by two cameras in binocular vision can be used for stereo matching, and may be realized by adopting a Stereo SGBM algorithm of open-cv. The bottom model of the cabin door is formed by calculating spatial coordinates of a plurality of points on the sill and the door seam lines, the modeled bottom model of the cabin door is a plane, and the plane includes information of a plurality of known points, such as the coordinates of these known points in the plane, the contrast and the edge direction on the image, and the like. When stereo matching is performed, in the spatial coordinate of the obtained plurality of points, points in the plane of the cabin door are reserved as effective points in the model, and points that are not in the plane of the cabin door are discarded. The bottom model of the cabin door of the aircraft is established by the plurality of effective points. Where, points having a distance less than or equal to the distance threshold from the plane of the cabin door are considered to locate in the plane of the cabin door and points having a distance greater than the distance threshold from the plane of the cabin door are considered to locate outside the plane of the cabin door. For example, the points having a distance less than or equal to 50 mm from the cabin door are retained, and the points having a distance greater than 50 mm from the cabin door are discarded.

Step S215: re-acquiring the aircraft image;

In the dynamic process of the boarding bridge approaching to the cabin door, the target aircraft image is obtained dynamically, for example, each frame of the obtained aircraft image may be identified, i.e., the aircraft image is updated once in each frame. Of course, in practical application, the target aircraft image may also be obtained according to other rules, for example, the target aircraft image is obtained every second or more, which is not specifically limited in the embodiments of the present disclosure.

Step S216: searching a bottom region of interest in the newly acquired aircraft image by matching the bottom model of the cabin door;

Where, the newly acquired aircraft image is the aircraft image which is reacquired in Step S215. Since the aircraft picture is rapidly acquired by frames, and the contents of pictures obtained in two adjacent times in the docking process do not change much, the bottom region of interest in the aircraft picture obtained this time may be searched according to the position of the bottom region of interest in the aircraft picture obtained last time, so that the calculation amount can be greatly reduced, and the speed of obtaining the bottom region of interest at this time is improved. Meanwhile, searching in a way of matching the bottom model of the cabin door can further reduce the calculated amount compared with searching in a way of matching bottom features of the cabin door for the first time. In the updating process, as the relative position of the boarding bridge and the aircraft changes, the size of the aircraft image changes in the obtained image, and the aircraft image can be scaled when the bottom region of interest of the newly obtained aircraft image is acquired. For example, when the aircraft and the boarding bridge are close to each other, the aircraft image can be zoomed out, and when the aircraft and the boarding bridge are away from each other, the aircraft image can be zoomed in. The multiples of zoom out or zoom in may be calculated by the amount of change in the distance between the aircraft and the boarding bridge, for example, calculating based on the relative speed therebetween, and the time interval of image updating, or may be calculated by using an image pyramid to traverse a plurality of magnification or reduction scales, for example, 0.8 to 1.2 times. In addition, a newly obtained aircraft image may be analyzed into a plurality of images with arrangement based on a resolution ranging from small to large, and one image with the highest matching degree with the bottom model of the cabin door can be selected as the current aircraft image by sequentially matching the images with the bottom model of the cabin door.

After the bottom region of interest and the bottom model of the cabin door are obtained for the first time, traverse around the current door region in the image in the next frame to search for the bottom region of interest, if the bottom region of interest is not found, expend the searching range, and reduce the matching degree requirement, and if the bottom region of interest is not found in three continuous frames, report the tracking failure and then end the tracking and positioning task, and after that, the cabin door information may be searched again.

Step S217: updating the spatial position of the cabin door sill of the aircraft according to the bottom region of interest in the newly acquired aircraft image.

In this step, the endpoint of the cabin door sill is searched in the bottom region of interest in the newly acquired aircraft image by using the bottom model of the cabin door generated last time;

The spatial position of the endpoint of the cabin door sill is calculated.

For the same aircraft, the position of the endpoint of the cabin door sill of the aircraft on the aircraft is not changed, i.e., the position thereof on the aircraft image is also not changed, and the endpoint of the cabin door sill may be searched in the bottom region of interest according to the bottom model of the cabin door. After the endpoint of the cabin door sill is searched in the bottom region of interest, the spatial positions of two endpoints of the doorsill are calculated.

The spatial position of the endpoints of the cabin door sill is updated by the bottom model of the cabin door, thereby reducing the calculation amount of updating the spatial position of the endpoints of the cabin door sill in the process that the boarding bridge continuously approaches the aircraft, and improving the response speed.

It should be noted that, during the process of the boarding bridge approaching the cabin door, updating of the target aircraft image and updating of the spatial position of the endpoints of the cabin door sill are continuous, and for example, updating may be performed at intervals of a specified time, such as 0.2 seconds, 0.5 seconds, 1 second, 3 seconds, 4 seconds, 10 seconds, and the like.

Step S218: if an identification stopping instruction is received, stopping acquiring of the spatial position of the cabin door, or otherwise, performing the step S215.

Judging whether an identification stopping instruction is received; when the identification stopping instruction is received, stopping identification of the cabin door; and when the identification stopping instruction is not received, updating the aircraft image until the identification stopping instruction is received. Where, the identification stopping instruction is used for controlling to stop identifying the cabin door, for example, after the boarding bridge docking with the cabin door is completed, the identification of the cabin door is stopped through the identification stopping instruction.

In the process of the boarding bridge dynamically approaching the cabin door, the cabin door needs to be tracked and positioned after the bottom model of the cabin door is established, and the bottom position of the cabin door in each frame of image is updated. Since the position of the cabin door in the image changes slowly and continuously in practice, bottom features of the cabin door are searched near the position of the image in the previous frame is not only efficient but also accurate.

Further, the method further includes: a step S219 after the step S216 and before the step S218.

Step S219: calculating a matching degree between the bottom model of the cabin door and the newly acquired bottom region of interest, and if the matching degree is smaller than a preset threshold value, reestablishing the bottom model of the cabin door according to the newly acquired bottom region of interest.

The matching degree of the newly acquired bottom region of interest and the bottom model of the cabin door is compared. When the matching degree of the newly acquired bottom region of interest and the bottom model of the cabin door is smaller than a preset threshold value, the bottom model of the cabin door is updated according to the newly acquired bottom region of interest. For example, if the matching degree is less than 0.9, a template is relearned and the model is updated.

Further, in order to ensure the sharpness of the aircraft image during the image identification, the method includes a step of performing noise reduction process on the aircraft image before the step S212.

The step of performing noise reduction process on the aircraft image includes: adjusting brightness of the aircraft image; judging whether the aircraft image has noise according to the signal-to-noise ratio of the aircraft image; and filtering out the noise when the aircraft image has noise.

Figure 17:
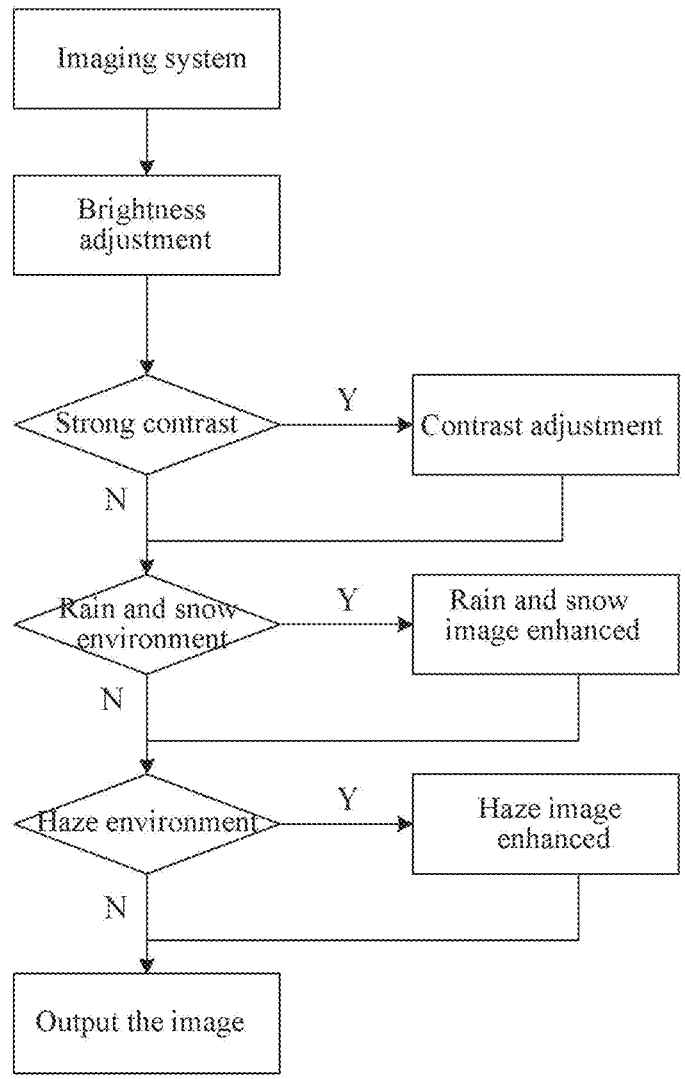
FIG. 17 is a flowchart of pre-processing an aircraft image in an embodiment of the present disclosure.

Firstly, as shown in FIG. 17, evaluate the brightness of the acquired original aircraft image, and adjust the brightness of the aircraft image to achieve the best brightness. Then, evaluate the imaging environment of the aircraft image, and screen and process the aircraft image with high contrast (such as direct light, reflected light, partial backlight or the like), the aircraft image in rain and snow weather and the aircraft image in haze weather, and finally the high-quality aircraft image is output from the preprocessing module, so that the speed, reliability and precision of the identification and positioning of the cabin door in the subsequent steps are improved.

Figure 18:
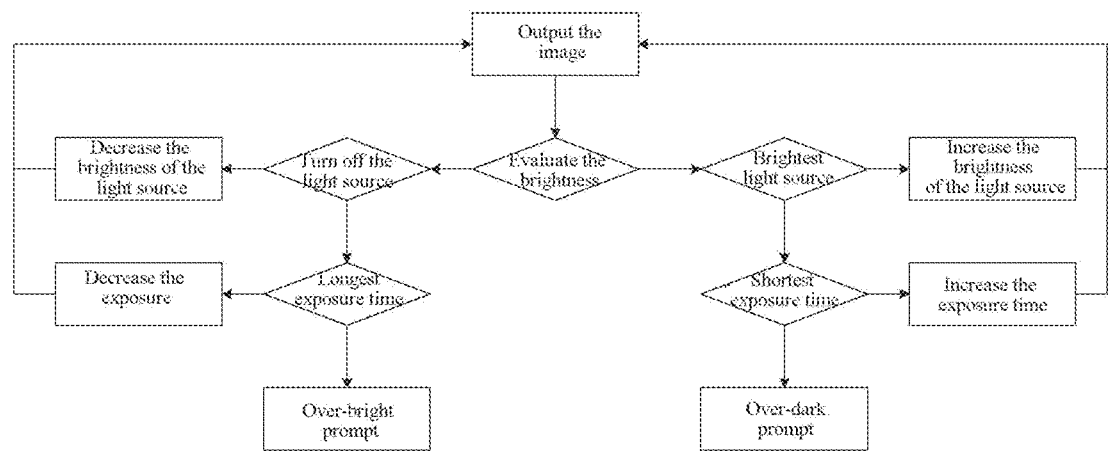
FIG. 18 is a flowchart of adjusting the brightness of an aircraft image in an embodiment of the present disclosure.

As shown in FIG. 18, the steps of brightness adjustment are as follows: firstly, evaluating whether the brightness of the aircraft image is qualified, if the brightness is too bright, preferably adjusting the brightness of the light source, if the light source is turned off then adjusting (decreasing) the exposure time of the imaging equipment, adjusting according to a certain amount of subdivision each time until the brightness of the aircraft image meets the requirements, and then outputting the aircraft image with the brightness meeting the requirement after adjustment is finished, if the light source is has been turned off and the exposure time has been adjusted to be the shortest, but the brightness of the aircraft image is still too bright, then outputting an over-bright prompt, and finishing the adjustment. If the brightness is too dark, also preferably adjusting the brightness of the light source, and if the light source is adjusted to be brightest, then adjusting (increasing) the exposure time of the imaging equipment, and adjusting each time according to a certain amount of subdivision until the brightness of the aircraft image meets the requirement, outputting the aircraft image with the brightness meeting the requirement after the adjustment is finished, and if the light source is adjusted to be brightest and the exposure time is adjusted to be longest but the brightness of the aircraft image is still too dark, outputting an over-dark prompt, and finishing the adjustment.

After the brightness adjustment is finished, the aircraft image is further processed to improve the adaptability of the system to all-weather operation. Firstly, the contrast of the aircraft image is detected, and the aircraft image is optimized and enhanced to increase the processing capacity of the system for situations of strong shadow, local illumination and the like. The method of contrast detection adopts histogram analysis, histogram equalization processing is performed on the aircraft image with abnormal brightness distribution, the optimized target aircraft is obtained, and the details of portions with highlight and backlight can be well represented. The rain and snow may be regarded as check noise in the aircraft image, whether the aircraft image belongs to the rain and snow may be identified through the signal-to-noise ratio, and then most of noise interference caused by the rain and snow may be filtered out through the media filtering. The influence of fog and haze to the aircraft image can reduce sharpness and the acuteness of the aircraft image, and can be recovered very well by guiding filter.

After preprocessing, the aircraft image is already able to represent the information of the cabin door, and then searching the cabin door. At the beginning, the system does not know the position of the cabin door in the aircraft image, so the door must be identified from the target aircraft image before spatial position detection can be performed. Once the cabin door is detected and confirmed, positioning can only focus on two corners of the bottom of the cabin door with the most abundant feature information and the most critical position information, and continuously track the position of this part of the aircraft image, so that the region for processing the aircraft image is reduced, and the speed and the precision thereof are improved.

It should be noted that although steps of the method of the present disclosure are depicted in the drawings in a particular order, this does not require or imply that the steps must be performed in this particular order or that all of the depicted steps must be performed to achieve desirable results. Additionally or alternatively, certain steps may be omitted, multiple steps may be combined into one step to be performed, and/or one step may be divided into multiple steps to be performed, etc.

In one exemplary embodiment of the present disclosure, an electronic equipment capable of implementing the above method is also provided.

As will be appreciated by those skilled in the art, aspects of the present disclosure may be embodied as a system, a method or a program product. Accordingly, various aspects of the present disclosure may be embodied in the form as follows: an entire hardware implementation, an entire software implementation (including firmware, microcode, etc.), or an implementation combining hardware and software that may generally be referred to as a "circuit", "module" or "system" herein.

Figure 19:
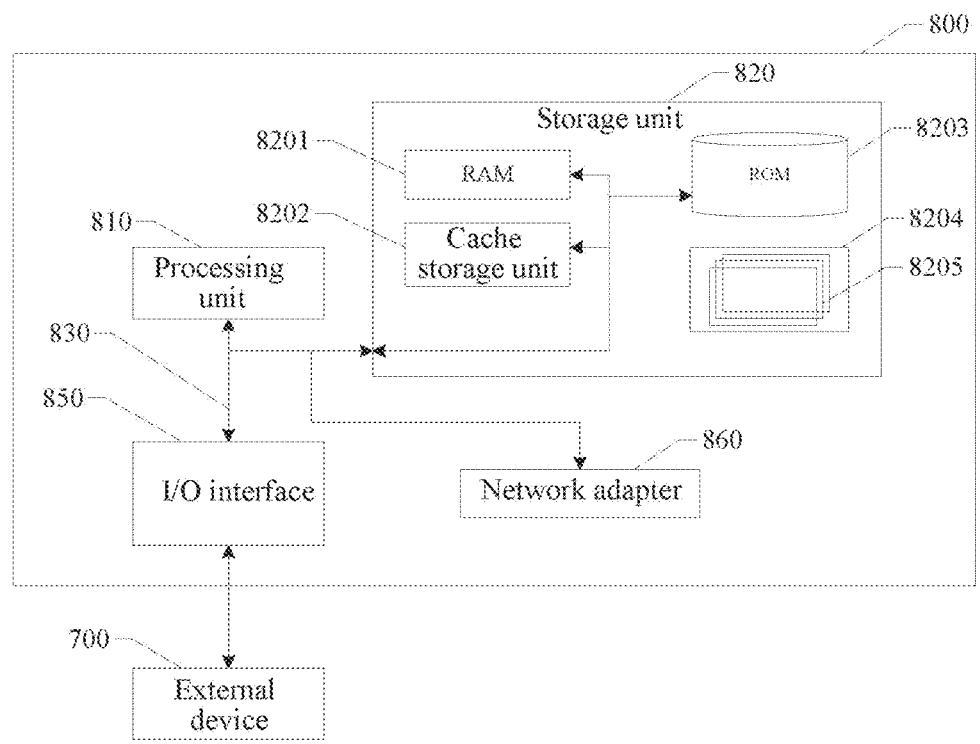
FIG. 19 is a schematic view of an electronic equipment in an embodiment of the present disclosure.
Figure 20:
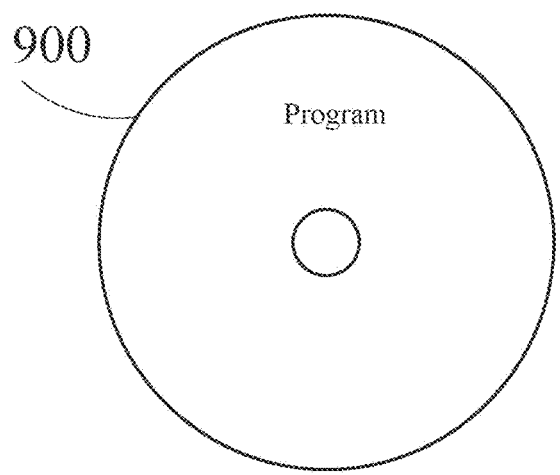
FIG. 20 is a schematic view of a computer-readable storage medium in an embodiment of the present disclosure.

An electronic equipment 800 according to this embodiment of the present disclosure is described below with reference to FIG. 19. The electronic equipment 800 shown in FIG. 19 is only an example and should not limit the function and usage scope of the embodiments of the present disclosure.

As shown in FIG. 16, the electronic equipment 800 is expressed in the form of a general purpose computing equipment. The components of the electronic equipment 800 may include, but may not be limited to: the at least one processing unit 810, the at least one storage unit 820, and a bus 830 connecting different system components (including the storage unit 820 and the processing unit 810).

The storage unit stores program codes that may be executed by the processing unit 810, such that the processing unit 810 performs the steps according to various exemplary embodiments of the present disclosure described in the above section "exemplary method" of this specification.

The storage unit 820 may include readable medium in the form of volatile storage units, such as a random access storage unit (RAM) 8201 and/or a cache storage unit 8202, and may further include a read only storage unit (ROM) 8203.

The storage unit 820 may also include a program/utility tool 8204 having a set (at least one) of program modules 8205, the program module 8205 includes, but is not limited to: an operating system, one or more application programs, other program modules, and program data, each of which or some combination thereof may include an implementation of a network environment.

The bus 830 may be one or more of several types of bus structures including a storage unit bus or storage unit controller, a peripheral bus, a graphics acceleration port, a processing unit, or a local bus using any of a variety of bus structures.

The electronic equipment 800 may also communicate with one or more external devices 700 (e.g., keyboard, pointing device, Bluetooth device, etc.), with one or more devices that enable a user to interact with the electronic equipment 800, and/or with any device (e.g., router, modem, etc.) that enables the electronic equipment 800 to communicate with one or more other computing devices. Such a communication may be performed via Input/Output (I/O) interface 850. Also, the electronic equipment 800 may communicate with one or more networks (e.g., a local area network (LAN), a wide area network (WAN), and/or a public network such as the internet) via the network adapter 860. As shown, the network adapter 860 communicates with the other modules of the electronic equipment 800 via the bus 830. It should be understood that although not shown in the figures, other hardware and/or software modules may be used in combination with the electronic equipment 800, including but not limited to: microcode, device drivers, redundant processing units, external disk drive arrays, RAID systems, tape drives, data backup storage systems, and the like.

With the above description of the embodiments, those skilled in the art will readily understand that the exemplary embodiments described herein may be implemented by software, and may also be implemented by software in combination with necessary hardware. Therefore, the technical solution according to the embodiments of the present disclosure may be embodied in the form of a software product, which may be stored in a non-volatile storage medium (which may be a CD-ROM, a USB disk, a removable hard disk, etc.) or on a network, and includes several instructions to enable a computing device (which may be a personal computer, a server, a terminal device, or a network device, etc.) to execute the method according to the embodiments of the present disclosure.

In one exemplary embodiment of the present disclosure, there is also provided a computer-readable storage medium on which a program product capable of implementing the above-described method of the present specification is stored. In some possible embodiments, various aspects of the present disclosure may also be implemented in the form of a program product including program code for causing a terminal device to perform the steps according to various exemplary embodiments of the present disclosure as described in the "exemplary method" section above of this specification, when the program product is performed on the terminal device.

Referring to the drawings, a program product 900 for implementing the above method according to an embodiment of the present disclosure is described, which may employ a portable compact disc read only memory (CD-ROM) and include program code, and may be performed on the terminal device, such as a personal computer. However, the program product of the present disclosure is not limited thereto, and in this text, a readable storage medium may be any tangible medium that may contain, or store programs for use by or in connection with an instruction execution system, apparatus, or device.

The program product may employ any combination of one or more readable media. The readable medium may be a readable signal medium or a readable storage medium. The readable storage medium may be, for example, but not limited to, an electronic, magnetic, optical, electromagnetic, infrared, or semiconductor system, apparatus, or device, or any combination thereof. More specific examples (a non-exhaustive list) of the readable storage medium include: an electrical connection having one or more wires, a portable disk, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof.

The computer-readable signal medium may include a data signal that is transmitted in base band or as part of a carrier wave, in which readable program code is carried. The propagated data signal may in a variety of forms, including, but not limited to, electromagnetic signals, optical signals, or any suitable combination thereof. The readable signal medium may be any readable medium that is not a readable storage medium and that may communicate, propagate, or transport a program for use by or in connection with an instruction execution system, apparatus, or device.

The program code embodied on the readable medium may be transmitted using any appropriate medium, including but not limited to wireless, wireline, optical cable, RF, etc., or any suitable combination thereof.

The program code for performing operations of the present disclosure may be written in any combination of one or more programming languages, including an object oriented programming language such as Java, C++ or the like and conventional procedural programming languages, such as the "C" programming language or similar programming languages. The program code may execute entirely on the user's computing device, partly on the user's device, as a stand-alone software package, partly on the user's computing device and partly on a remote computing device, or entirely on the remote computing device or server. In situations involving remote computing devices, the remote computing devices may be connected to the user computing device through any kind of network, including a Local Area Network (LAN) or a Wide Area Network (WAN), or may be connected to external computing devices (e.g., through the internet using an internet service provider).

It should be noted that although in the above detailed description, several modules or units of the device for action execution are mentioned, such a division is not mandatory. Indeed, the features and functions of two or more modules or units described above may be embodied in one module or unit, according to embodiments of the present disclosure. In contrast, the features and functions of one module or unit described above may be further divided into embodiments by a plurality of modules or units.

Moreover, although steps of the methods of the present disclosure are depicted in the drawings in a particular order, this does not require or imply that these steps must be performed in this particular order, or that all of the depicted steps must be performed to achieve desirable results. Additionally or alternatively, certain steps may be omitted, multiple steps may be combined into one step to be performed, and/or one step may be broken into multiple steps to be performed, etc.

With the above description of the embodiments, those skilled in the art will readily understand that the exemplary embodiments described herein may be implemented by software, and may also be implemented by software in combination with necessary hardware. Therefore, the technical solution according to the embodiments of the present disclosure may be embodied in the form of a software product, which may be stored in a non-volatile storage medium (which may be a CD-ROM, a USB disk, a removable hard disk, etc.) or on a network, and includes several instructions to enable a computing device (which may be a personal computer, a server, a mobile terminal, or a network device, etc.) to execute the method according to the embodiments of the present disclosure.

Other embodiments of the present disclosure will be apparent to those skilled in the art after reading the specification and implementing the present disclosure disclosed herein. The present application is intended to cover any variations, purposes, or adaptations of the present disclosure, which are in accordance with the general principles of the present disclosure and include common general knowledge or conventional technical means in the art that are not disclosed in the present disclosure. The specification and embodiments are to be regarded as illustrative only, and the real scope and spirit of the present disclosure is defined by the attached claims.

What is claimed is:

1. A method for docking a boarding bridge with an aircraft, comprising:
   planning a path from a position at which a bridgehead is located when the boarding bridge is at a parking position to a pre-docking position which is 1 to 2 meters away from a cabin door of the aircraft;
   driving the boarding bridge to move the bridgehead towards the pre-docking position along the path until the bridgehead moves to a position within 2 meters away from the pre-docking position;
   acquiring an aircraft image of the aircraft, obtaining a spatial position of the cabin door according to the aircraft image;
   moving the boarding bridge according to the spatial position to enable the bridgehead to dock with the cabin door;
   wherein the planning a path from a position at which a bridgehead is located when the boarding bridge is at a parking position to a pre-docking position which is 1 to 2 meters away from a cabin door, and driving the boarding bridge to move the bridgehead towards the pre-docking position along the path until the bridgehead moves to a position within 2 meters away from the pre-docking position comprises:
   acquiring a preset anti-collision line of the wing;
   acquiring a pre-docking position and a position at which the bridgehead is located when the boarding bridge is at the parking position, and generating a path for connecting the two positions;
   simulating the process of the boarding bridge moving to the pre-docking position along the path, and adjusting at least a part of the path in front of an engine in a direction radially away from the engine in case that an interference is formed between the anti-collision line of the wing and an outer contour of the boarding bridge during the simulating, and then simulating again unless no more interference between the anti-collision line of the wing and the outer contour of the boarding bridge be formed; and
   driving the boarding bridge to move the bridgehead towards the pre-docking position along the path until the bridgehead moves to a position within 2 meters from the pre-docking position.

2. The method according to claim 1, wherein the acquiring an aircraft image of the aircraft, obtaining a spatial position of the cabin door according to the aircraft image, moving the boarding bridge according to the spatial position to enable the bridgehead to dock with the cabin door comprises:

acquiring the aircraft image in real time when the bridgehead is moving from a position within 2 meters away from the pre-docking position to a position where the bridgehead is docked with the cabin door, and updating a spatial position of the cabin door in real time according to the aircraft image; and moving the boarding bridge according to a newly acquired spatial position of the cabin door as a docking destination of the bridgehead until the bridgehead is docked with the cabin door.

3. The method according to claim 2, wherein the acquiring the aircraft image in real time when the bridgehead is moving from a position within 2 meters away from the pre-docking position to a position where the bridgehead is docked with the cabin door, and updating a spatial position of the cabin door in real time according to the aircraft image comprises:

acquiring the aircraft image;

identifying a region of interest of the cabin door in the aircraft image according to features of the cabin door; and obtaining a spatial position of a cabin door sill according to features of a bottom of the cabin door and the region of interest of the cabin door.

4. The method according to claim 3, wherein the obtaining a spatial position of a cabin door sill according to features of a bottom of the cabin door and the region of interest of the cabin door comprises:

identifying a frame of the cabin door in the region of interest of the cabin door according to the features of the bottom of the cabin door; and acquiring a spatial position of the frame of the cabin door according to a position of the frame of the cabin door in the aircraft image.

5. The method according to claim 4, wherein the identifying a frame of the cabin door in the region of interest of the cabin door according to the features of the bottom of the cabin door comprises:

identifying the cabin door sill in the region of interest of the cabin door, and marking a top center point of the cabin door sill as an identification point;

searching door seam lines in images at two sides of the identification point; and acquiring an intersection of a horizontal line and a vertical line of the door seam lines as an endpoint of the cabin door sill.

6. The method according to claim 5, further comprising:

acquiring a bottom region of the cabin door containing the cabin door sill according to the position of the cabin door sill in the aircraft image, and establishing a bottom model of the cabin door according to the bottom region of the cabin door;

re-acquiring the aircraft image;

searching a bottom region of interest in a newly acquired aircraft image by matching the bottom model of the cabin door; and updating a spatial position of the cabin door sill of the aircraft according to the bottom region of interest in the newly acquired aircraft image.

7. The method according to claim 6, further comprising, after matching the bottom model of the cabin door, a step of:

calculating a matching degree between the bottom model of the cabin door and the newly acquired bottom region of interest, and in case that the matching degree is smaller than a preset threshold value, reestablishing the bottom model of the cabin door according to the newly acquired bottom region of interest.

8. The method according to claim 3, wherein the identifying a region of interest of the cabin door in the aircraft image according to the features of the cabin door comprises:

performing edge detection on the aircraft image to obtain a plurality of edge lines;

extracting vertical lines extending in a vertical direction from the plurality of edge lines, and calculating spatial positions of two endpoints of each of the vertical lines;

calculating a length of each of the vertical lines and a spacing between every two vertical lines according to the spatial positions of the two endpoints of each of the vertical lines;

delimiting a region between two vertical lines in the aircraft image as a region of interest of the cabin door when lengths of the two vertical lines of the plurality of vertical lines are matched with a length of the cabin door, a spacing between the two vertical lines is matched with a width of the cabin door, and a ratio of the lengths of the two vertical lines to the spacing between the two vertical lines is matched with a ratio of the length to the width of the cabin door.

9. The method according to claim 1, wherein a first inflection point is added to the path when the path is adjusted, and the first inflection point is located in front of the engine closest to the cabin door and at least 1.5 meters away from the closest engine and a wing on which the closest engine is installed.

10. The method according to claim 9, wherein a second inflection point is added to the path when the path is adjusted, and the second inflection point is located in front of the engine which is on the same side of the cabin door but furthest from the cabin door, and the second inflection point is at least 1.5 meters away from the engine.

11. The method according to claim 10, wherein a third inflection point is added to the path when the path is adjusted, and the third inflection point is located in front of a tail end of the wing and at least 1.5 meters away from the wing.

12. The method according to claim 1, wherein the anti-collision line of the wing comprises a first line segment extending from the front of the tail end of the wing to the front of the engine closest to the cabin door, and a second line segment extending from an end of the first line segment adjacent to the cabin door to a side of the cabin door facing away from an aircraft nose.

13. The method according to claim 1, further comprising:

establishing a first coordinate system fixed relative to the ground and a second coordinate system fixed relative to the aircraft;

wherein coordinates of positions of a ground identification and the bridgehead in the first coordinate system are known, and coordinates of the ground identification, the cabin door and anti-collision feature points in the second coordinate system are known;

the process of acquiring the pre-docking position comprises:

calculating the coordinate of the cabin door in the first coordinate system according to coordinates of the ground identification in the first coordinate system and the second coordinate system and the coordinate of the cabin door in the second coordinate system, and calculating a coordinate of a pre-docking point according to the coordinate of the cabin door in the first coordinate system;

the process of acquiring the anti-collision line of the wing comprises:

calculating coordinates of the anti-collision feature points in the first coordinate system according to the coordinates of the ground identification in the first coordinate system and the second coordinate system and coordinates of the anti-collision feature points in the second coordinate system, and connecting the anti-collision feature points so that the anti-collision line of the wing is acquired;

generating the path in the first coordinate system;

wherein the ground identification is characterized by a plurality of identification feature points, the bridgehead is characterized by a bridgehead feature point, the cabin door is characterized by a cabin door feature point, and the pre-docking position is characterized by the pre-docking point.

14. The method according to claim 13, wherein the identification feature points of the ground identification are intersection points where centerlines of two parking lines respectively intersect with a centerline of a guide line.

15. The method according to claim 14, wherein the first coordinate system and the second coordinate system are both rectangular coordinate systems;

wherein the Z-axis of the first coordinate system is vertical to the ground, and an origin of the first coordinate system is on the ground; an origin of the second coordinate system is at one of the identification feature points, the x-axis of the second coordinate system is vertical to the guide line, the y-axis is parallel to the guide line, and the z-axis is vertical to the ground.

16. A computer-readable storage medium, on which computer programs are stored, wherein the computer programs, when executed by a processor, implement a method for docking a boarding bridge with an aircraft, the method comprising:

planning a path from a position at which a bridgehead is located when the boarding bridge is at a parking position to a pre-docking position which is 1 to 2 meters away from a cabin door of the aircraft;

driving the boarding bridge to move the bridgehead towards the pre-docking position along the path until the bridgehead moves to a position within 2 meters away from the pre-docking position;

acquiring an aircraft image of the aircraft, obtaining a spatial position of the cabin door according to the aircraft image, and moving the boarding bridge according to the spatial position to enable the bridgehead to dock with the cabin door;

wherein the planning a path from a position at which a bridgehead is located when the boarding bridge is at a parking position to a pre-docking position which is 1 to 2 meters away from a cabin door, and driving the boarding bridge to move the bridgehead towards the pre-docking position along the path until the bridgehead moves to a position within 2 meters away from the pre-docking position comprises:

acquiring a preset anti-collision line of the wing;

acquiring a pre-docking position and a position at which the bridgehead is located when the boarding bridge is at the parking position, and generating a path for connecting the two positions;

simulating the process of the boarding bridge moving to the pre-docking position along the path, and adjusting at least a part of the path in front of an engine in a direction radially away from the engine in case that an interference is formed between the anti-collision line of the wing and an outer contour of the boarding bridge during the simulating, and then simulating again unless no more interference between the anti-collision line of the wing and the outer contour of the boarding bridge be formed; and driving the boarding bridge to move the bridgehead towards the pre-docking position along the path until the bridgehead moves to a position within 2 meters from the pre-docking position.

17. An electronic equipment, comprising:

a processor; and a memory for storing executable instructions of the processor;

wherein the processor is configured to perform a method for docking a boarding bridge with an aircraft by executing the executable instructions;

the method comprising:

planning a path from a position at which a bridgehead is located when the boarding bridge is at a parking position to a pre-docking position which is 1 to 2 meters away from a cabin door of the aircraft;

driving the boarding bridge to move the bridgehead towards the pre-docking position along the path until the bridgehead moves to a position within 2 meters away from the pre-docking position;

acquiring an aircraft image of the aircraft, obtaining a spatial position of the cabin door according to the aircraft image; and moving the boarding bridge according to the spatial position to enable the bridgehead to dock with the cabin door;

wherein the planning a path from a position at which a bridgehead is located when the boarding bridge is at a parking position to a pre-docking position which is 1 to 2 meters away from a cabin door, and driving the boarding bridge to move the bridgehead towards the pre-docking position along the path until the bridgehead moves to a position within 2 meters away from the pre-docking position comprises:

acquiring a preset anti-collision line of the wing;

acquiring a pre-docking position and a position at which the bridgehead is located when the boarding bridge is at the parking position, and generating a path for connecting the two positions;

simulating the process of the boarding bridge moving to the pre-docking position along the path, and adjusting at least a part of the path in front of an engine in a direction radially away from the engine in case that an interference is formed between the anti-collision line of the wing and an outer contour of the boarding bridge during the simulating, and then simulating again unless no more interference between the anti-collision line of the wing and the outer contour of the boarding bridge be formed; and driving the boarding bridge to move the bridgehead towards the pre-docking position along the path until the bridgehead moves to a position within 2 meters from the pre-docking position.

* * * * *